(12) United States Patent
Tamai et al.

(10) Patent No.: US 8,262,863 B2
(45) Date of Patent: Sep. 11, 2012

(54) PAPER MACHINE FOR USED PAPER RECYCLING APPARATUS

(75) Inventors: Shigeru Tamai, Osaka (JP); Yuji Koyama, Osaka (JP)

(73) Assignee: Seed Company Limited, Osaka (JP)

( * ) Notice: Subject to any disclaimer, the term of this patent is extended or adjusted under 35 U.S.C. 154(b) by 230 days.

(21) Appl. No.: 12/124,056

(22) Filed: May 20, 2008

(65) Prior Publication Data

US 2008/0314543 A1    Dec. 25, 2008

(30) Foreign Application Priority Data

Jun. 19, 2007 (JP) ................ 2007-161848

(51) Int. Cl.
*D21F 1/10* (2006.01)
*D21F 5/00* (2006.01)
(52) U.S. Cl. ............ 162/348; 162/358.1; 162/359.1
(58) Field of Classification Search ............ 162/147, 162/205, 212, 336, 350, 358.5, 348, 358.1, 162/359.1, 360.2
See application file for complete search history.

(56) References Cited

U.S. PATENT DOCUMENTS

| | | | | |
|---|---|---|---|---|
| 3,127,308 A | * | 3/1964 | Justus et al. | 162/349 |
| 6,372,094 B1 | * | 4/2002 | Heikkila et al. | 162/381 |
| 2007/0017649 A1 | * | 1/2007 | Tamai et al. | 162/289 |

FOREIGN PATENT DOCUMENTS

| | | |
|---|---|---|
| JP | 06-134331 A | 5/1994 |
| JP | 2007-213450 A | 8/2007 |

OTHER PUBLICATIONS

SMOOK, Handbook for Pulp and Paper Technologists, 1992, Angus Wilde Publications, 2nd edition, p. 271.*
Can-am Machinery, The Story of the Eagle Paper Machine [downloaded online from www.canammachinery.com], downloaded on Jul. 20, 2009, whole document.*

* cited by examiner

*Primary Examiner* — Anthony Calandra
(74) *Attorney, Agent, or Firm* — Cheng Law Group, PLLC

(57) ABSTRACT

The invention presents a paper machine for a used paper recycling apparatus being installed in a room of a small shop or the like, friendly to the environment, low in running cost, and capable of maintaining a high confidentiality. The paper machine includes a paper making process unit for manufacturing wet paper from slurry pulp suspension sent from the pulp making section of a preceding process, and a drying process unit for drying the wet paper manufactured in the paper making process unit and making recycled paper, in which a processing conveyor is disposed between the paper making process unit and the drying process unit extending in the overall length of the paper making process and the drying process, and this processing conveyor is manufactured in a form of net belt conveyor having a running mesh belt of mesh structure composed of innumerable mesh cells for filtering and dewatering the pulp suspension. In this configuration, it is not required to exchange the conveyors when changing the process of the manufactured wet paper from the paper making process to the drying process.

19 Claims, 9 Drawing Sheets

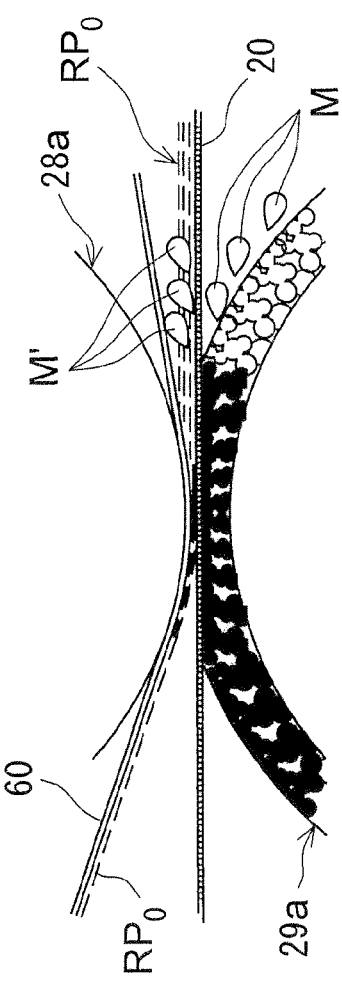
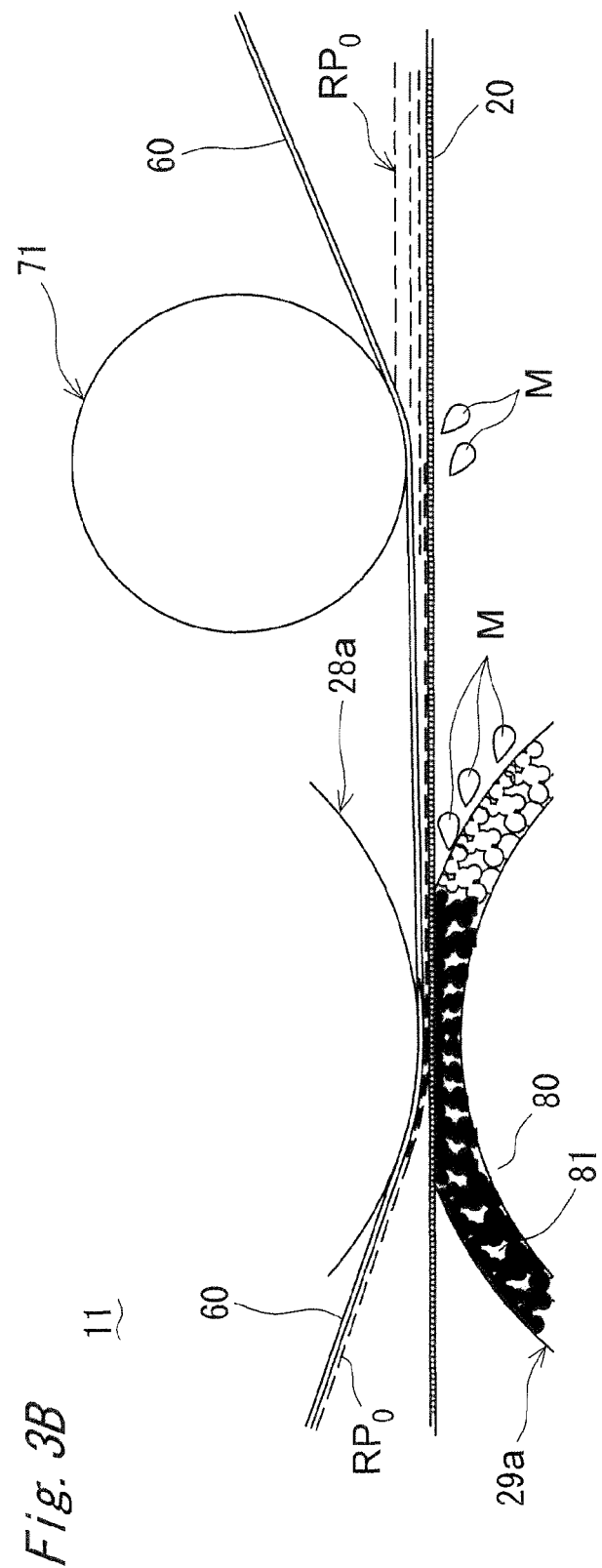

PAPER MACHINE FOR USED PAPER RECYCLING APPARATUS

BACKGROUND OF THE INVENTION

1. Field of the Invention

The invention relates to a paper machine for used paper recycling apparatus, and more particularly to a paper machine for a small-type used paper recycling apparatus of furniture size installed at the site of origin of used paper, for recycling and processing into reusable paper at the site without discarding the generated used paper, in which the slurry pulp suspension is manufactured into wet paper.

2. Description of the Related Art

Used paper of various types occurs not only in government offices or private companies, but also in daily life or general household. Used paper is usually discarded, incinerated, or disposed as refuse.

On the other hand, in the global concern about effective use of limited resources on earth, various technologies have been developed to regenerate and reuse the used paper being disposed and discarded so far.

Such used paper recycling technologies are mostly installed in paper making industry, and the used paper recycling plant requires, like the ordinary paper making plant, a vast land, an immense investment, and a huge quantity of water and chemicals for the purpose of high speed and mass production and high quality of recycled paper.

For recycling of used paper, a tremendous manual labor is needed for collecting used paper, and used paper collection involves various problems, such as mixing of foreign matter by garbage collectors, defective classification due to lack of knowledge about used paper recycling, and entry of harmful objects, and if used paper is collected, in order to recycle by 100 percent, final checking by specialists and cleaning works are needed. On the other hand, confidential documents are not easily recycled and are mostly incinerated in order to protect the security, and the recycling rate is low.

To solve these problems of used paper recycling, an effective method is the technology capable of recycling at the site of origin of used paper, and from such point of view, a new system is proposed, for example, in Japanese Patent Application Laid-Open No. H6-134331.

This apparatus is a wet process shredder for shredding used paper into small pieces while adding a small amount of water, and shredded chips from the shredder are sent outside to a recycling plant, and used as material for recycled paper.

Shredded chips from the shredder are deformed into pulp, and are not in the state of piece of paper, and a high confidentiality is guaranteed, and it is expected to promote recycling of confidential documents.

This wet process shredder is a giant machine installed in a wide space, and it can be used only in a large office, and it is not suited to small office or general household where the space for installation is limited and the quantity of generated used paper is small. If shredded chips may be used as material for recycled paper, processing is possible only in large recycling plant, and the recycling cost is high and it is not economical.

To solve such problems of the prior art, the present applicant has developed a used paper processing apparatus as disclosed in Japanese Patent Application Laid-Open No. 2007-213450.

This used paper processing apparatus includes, in an apparatus case of furniture size, a pulp making section for manufacturing used paper pulp by macerating and mashing used paper, a paper making section for manufacturing recycled paper by making the used paper pulp manufactured in the pulp making section, and a control section for driving and controlling the pulp making section and paper making section by interlocking, and it is installed in a room where used paper occurs, and the used paper is macerated and processed in the pulp making section, and leak or discharge of confidential information or private data written in the used paper can be prevented, and further the used paper pulp is manufactured into paper in the paper making section, and the recycled paper is manufactured.

According to this used paper processing apparatus, which can be installed in a small office or a general household, a high confidentiality is assured, and it is friendly to the environment, and low in the running cost.

SUMMARY OF THE INVENTION

It is a primary object of the invention to present a novel paper machine for a used paper recycling apparatus capable of solving such conventional problems.

It is other object of the invention to present a paper machine of a simple structure, improved from the structure of the conventional paper machine for a used paper recycling apparatus, and advanced in the recycling and processing function to manufacture recycled paper from used paper pulp.

It is another object of the invention to present a used paper recycling apparatus having the above paper machine to be installed not only in a large office, but also in a small shop or a room in general household, friendly to the environment and low in running cost, capable of preventing leak of confidential information, private information, and other information, and keeping a high confidentiality.

To achieve these objects, the paper machine of the invention is a paper machine making up a part of a used paper recycling device of furniture size installed at the origin of used paper, for manufacturing recycled paper from used paper pulp manufactured in a pulp making machine in a preceding process, and includes a paper making process unit for manufacturing wet paper from slurry pulp suspension containing water and used paper pulp sent from the pulp making section, and a drying process unit for drying the wet paper manufactured in the paper making process unit and making recycled paper, and the paper making process unit and the drying process unit are disposed in upper and lower layers, and a processing conveyor is disposed between the paper making process unit and the drying process unit in upper and lower layer structure extending in the overall length of the paper making process and the drying process, and this processing conveyor is manufactured in a form of net belt conveyor having a running mesh belt of mesh structure composed of innumerable mesh cells for filtering and dewatering the pulp suspension.

Preferred embodiments include the following.

(1) The mesh belt of the net belt conveyor runs straightly in the paper making process unit toward the running direction, and runs straightly back and forth in opposite directions in the drying process unit.

(2) In the paper making process unit, the paper making process length of the mesh belt is set in a range of straight running direction length of the mesh belt in the apparatus case of furniture size.

(3) The paper making process length of the mesh belt is sufficient for manufacturing the pulp suspension into a proper paper weight in relation between the filtering and dewatering rate of the mesh structure and the running speed of the mesh belt, and is set so that the paper making conveyor having the mesh belt may be contained in the apparatus case of furniture size.

(4) The mesh belt is disposed so as to run upward obliquely and straightly toward its running direction.

(5) The upward oblique angle of the mesh belt is set at 3 degrees to 12 degrees.

(6) The mesh size of the mesh belt is set at 25 mesh cells to 80 mesh cells.

(7) The running speed of the mesh belt is set at 0.1 m/min to 1 m/min.

(8) The paper making process unit is disposed at a start end position of the paper making process of the processing conveyor, and has a pulp feed unit for supplying the pulp suspension from the pulp manufacturing device to the paper making conveyor, and by this pulp feed unit, the pulp suspension is spread and supplied uniformly on the upside of the mesh belt of the processing conveyor.

(9) In the drying process unit, there is a drying conveyor for conveying the wet paper manufactured in the paper making process unit while smoothing and drying, and this drying conveyor is formed as a smooth belt conveyor having a running smooth surface belt of a smooth surface for smoothing the wet paper manufactured in the paper making process unit, and this smooth surface belt runs along the lower side of the running route of the mesh belt of the net conveyor belt, and cooperates with this mesh belt to convey the wet paper while holding from upper and lower sides.

(10) The drying process unit also includes pressing means for pressing the smooth surface belt and the mesh belt by a uniform pressure, and this pressing means has a plurality of pressing rollers disposed at specified pitches in the running direction of the both belts.

(11) In the drying process unit, the lower side of the wet paper is conveyed and supported by the smooth surface belt, and the upper side of the wet paper is conveyed and supported by the mesh belt, and the plurality of pressing rollers press the mesh belt from the upper side.

(12) In the drying process unit, the smooth surface belt for conveying and supporting the lower side of the wet paper is heated by a heater.

(13) The heater has a heater plate sliding on the opposite side of the conveying and supporting surface of the wet paper on the smooth surface belt, and the wet paper on the smooth surface belt is indirectly heated and dried by the smooth surface belt heated by the heater plate.

(14) In the drying process unit, a cover is provided for controlling the ventilation of the mesh belt for conveying and supporting the upper side of the wet paper.

(15) At the junction of the paper making process unit and the drying process unit, a dewatering roll unit is provided for squeezing and dewatering the wet paper, and this dewatering roll unit rolls and squeezes the mesh belt of the paper making process unit and the smooth surface belt of the drying process unit by pressing from upper and lower sides, and squeezes and dewaters the wet paper on the mesh belt.

(16) The paper making process unit, the dewatering roll unit and the drying process unit are driven by a common drive source.

The used paper recycling apparatus of the invention includes, in an apparatus case of furniture size, a pulp making section for manufacturing used paper pulp by macerating and mashing used paper, a paper making process unit for manufacturing recycled paper by making the used paper pulp manufactured in the pulp making section, and a control section for driving and controlling the pulp making section and the paper making section by interlocking, and the paper making process unit is composed of the paper machine of the invention described above.

The paper machine of the invention includes a paper making process unit for manufacturing wet paper from a slurry pulp suspension containing water and used paper pulp sent from the pulp making section of a preceding process, and a drying process unit for making recycled paper by drying the wet paper manufactured in the paper making section, and the paper making process unit and the drying process unit are disposed in upper and lower layers, and a processing conveyor is disposed between the paper making process unit and the drying process unit in upper and lower layer structure extending in the overall length of the paper making process and the drying process, and this processing conveyor is manufactured in a form of net belt conveyor having a running mesh belt of mesh structure composed of innumerable mesh cells for filtering and dewatering the pulp suspension, and hence the wet paper manufactured in the paper making process unit is transferred directly to the drying process unit, and is dried and processed.

That is, the slurry pulp suspension sent from the pulp making section of a preceding process is processed on the same net belt conveyor sequentially from the paper making process to the drying process, and it is not required to exchange the conveyors when transferring the processed wet paper from the paper making process to the drying process, and troubles in the transfer process (change of conveyors) can be avoided, such as defective transfer of wet paper, crease, tear or cut of paper, and others, and a recycled paper of high quality is obtained.

According to the paper machine of the invention, the following outstanding effects are obtained, and the used paper recycling apparatus can be installed not only in a large office, but also in a small shop or ordinary household, and is friendly to the environment and low in running cost, and capable of preventing leak of confidential information, private information, and other information, and keeping a high confidentiality.

(1) The used paper recycling apparatus of small size and simple structure includes, in an apparatus case of furniture size, a pulp making section for manufacturing used paper pulp by macerating and mashing used paper, a paper making section (the paper machine described above) for manufacturing recycled paper by making the used paper pulp manufactured in the pulp making section, and therefore without discarding the used paper, the used paper is recycled and reused at the same site of origin, and disposal of used paper is reduced, and refuse problems can be solved, and the limited resources can be utilized effectively.

Hitherto, because of confidential problems, recycling of used paper has not been promoted, but since the used paper can be recycled and reused at the same site of origin, effects of effective utilization of resources are outstanding.

(2) At the site of origin of used paper, a compact used paper recycling system having a same function as large scale system installed in paper making plant or used paper recycling plant is installed, and used paper can be recycled continuously in a closed circuit in a small shop or general household, and refuse collection and transportation expenses and incineration and other costs are saved, and it is very economical.

(3) Moreover, the apparatus structure is compact, and it can be installed not only in large office, but also in small shop or general household, and from this point of view, too, leak of confidential information and private information can be securely prevented.

(4) Being installed at the site of origin of used paper, the used paper is macerated and processed into used paper pulp, and the paper making section manufactures the used paper pulp into recycled paper, and thereby the used paper is circulated and used as recycled paper at the same site of origin, and therefore information of characters and patterns printed on the paper is not diffused outside of the site of origin of used paper, and leak of confidential information and private information can be prevented securely, and the resources can be utilized effectively.

That is, by using the used paper recycling apparatus having the paper machine of the invention as the paper making section, it is free from risk of external diffusion of information from a specific institute (for example, school, hospital, city office, law firm, patent office, general household).

In other words, in the case of a conventional shredder, if the used paper is shredded into small chips, and the printed characters and patterns are not legible, the shredded chips are incinerated at an external incineration site, and external diffusion cannot be prevented perfectly. In this regard, the waste chips may be stored within an internal warehouse, but storing place is needed, and the resources are used only once and are not utilized effectively.

By contrast, according to the used paper recycling apparatus of the invention, the information printed on the used paper is not diffused outside of the closed system, and the resources can be utilized effectively.

These and other features and objects of the invention will be more clearly appreciated and understood from the following detailed description given together with the accompanying drawings and novel facts disclosed in the claims.

BRIEF DESCRIPTION OF THE DRAWING

FIG. 3A is a schematic diagram of specific mechanism of squeezing and dewatering of dewatering roll unit in the paper making section, showing a basic squeezing and dewatering mechanism.

FIG. 3B is also a schematic diagram of specific mechanism of squeezing and dewatering of dewatering roll unit in the paper making section, showing a squeezing and dewatering mechanism when the slurry preventive roll is provided near the upstream side of the dewatering roll unit.

DETAILED DESCRIPTION OF THE PREFERRED EMBODIMENT

Figure 1:
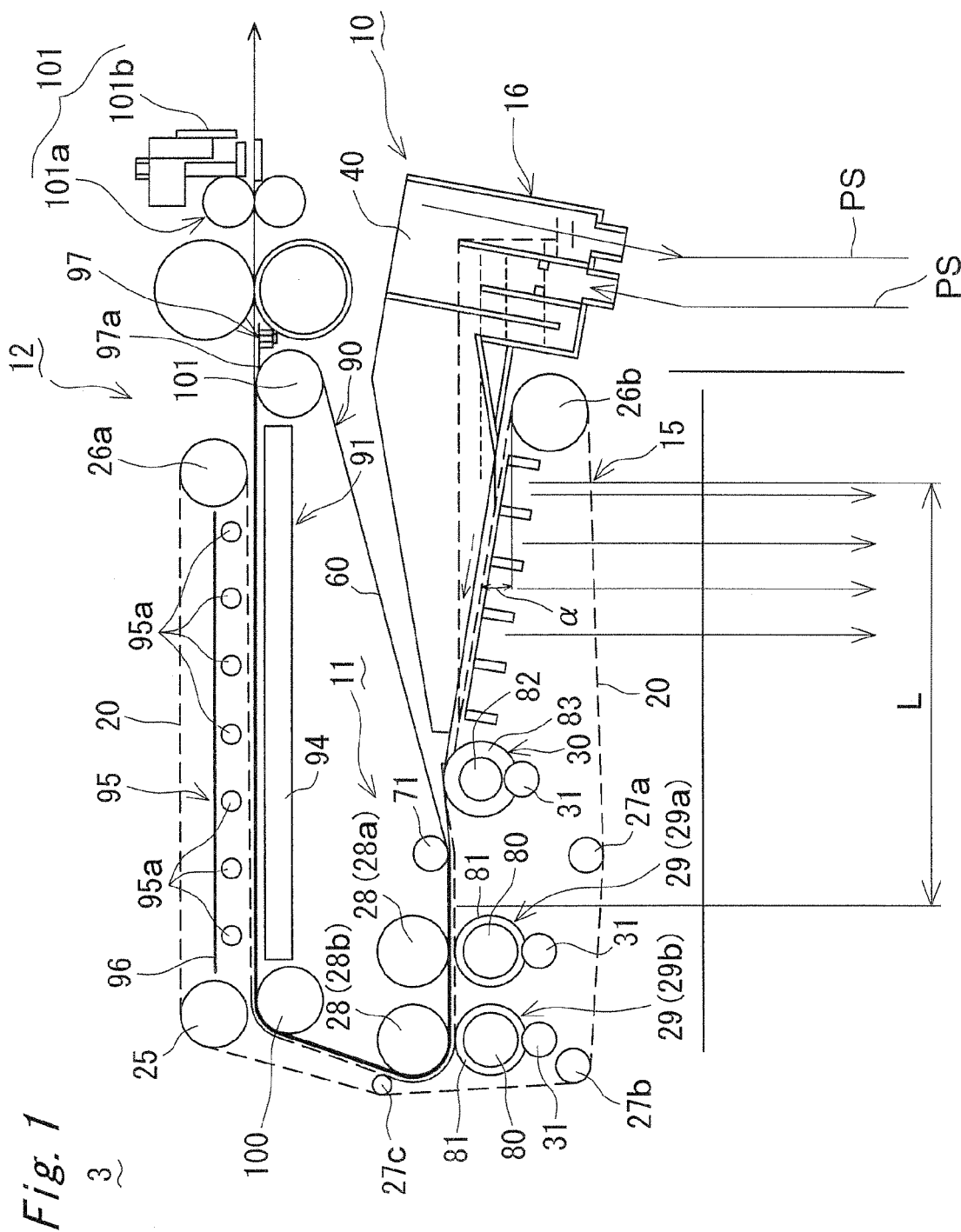
FIG. 1 is a front view of outline of paper making section (paper machine) of used paper recycling apparatus in a preferred embodiment of the invention.

A preferred embodiment of the invention is specifically described below while referring to the accompanying drawings. Throughout the drawings, same parts or elements are identified with same reference numerals.

A used paper recycling apparatus of the invention is shown in FIG. 1 to FIG. 9, and this used paper recycling apparatus 1 is specifically installed at the site of origin of used paper, and it is an apparatus for manufacturing recycled paper at the site without disposing or discarding the used paper UP, and such used paper UP includes confidential documents occurring in government offices and private companies, and private letters in general household, and other used and unnecessary documents.

Figure 6:
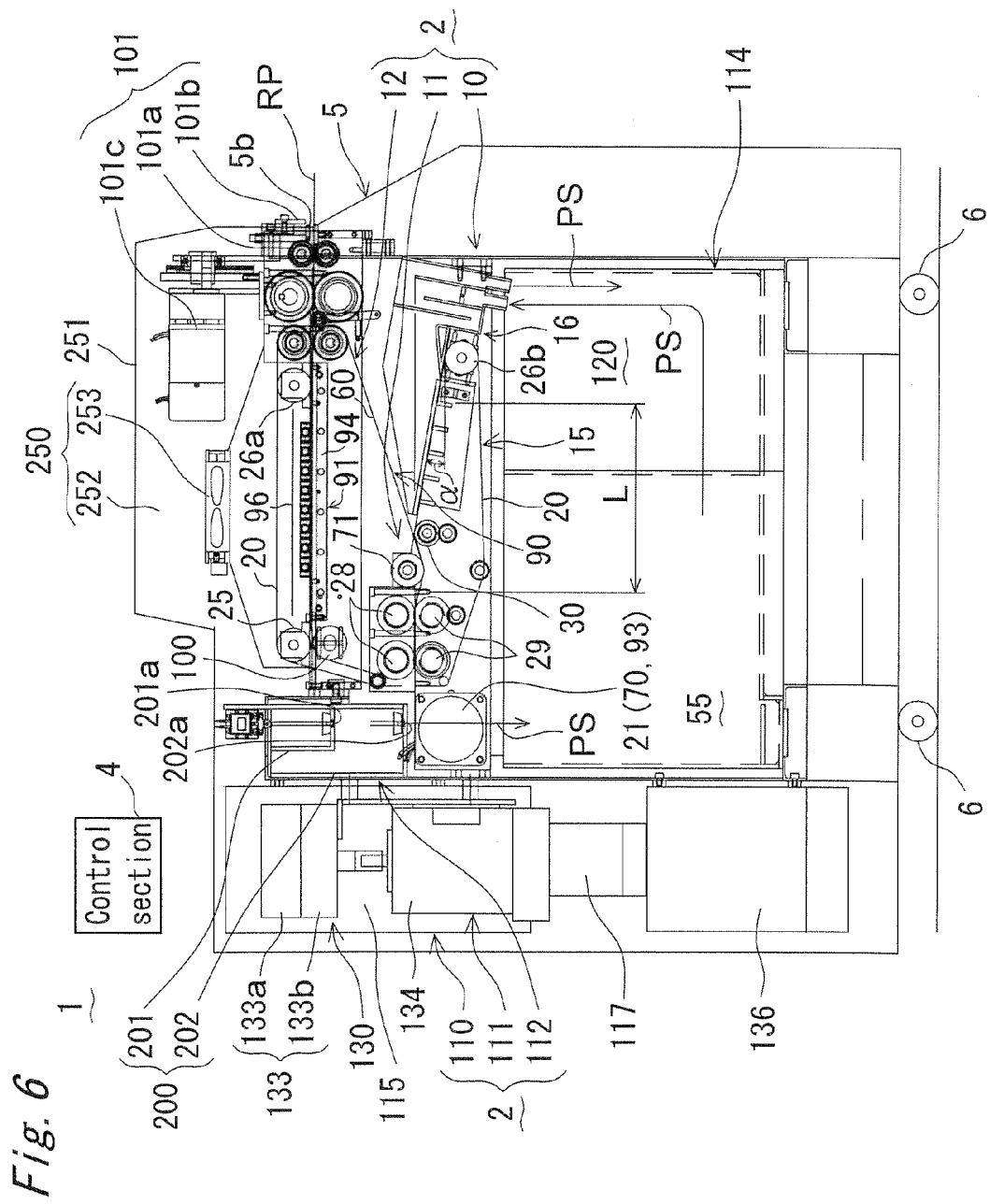
FIG. 6 is a front view of entire structure of the used paper recycling apparatus, showing a cut-open apparatus case.
Figure 7:
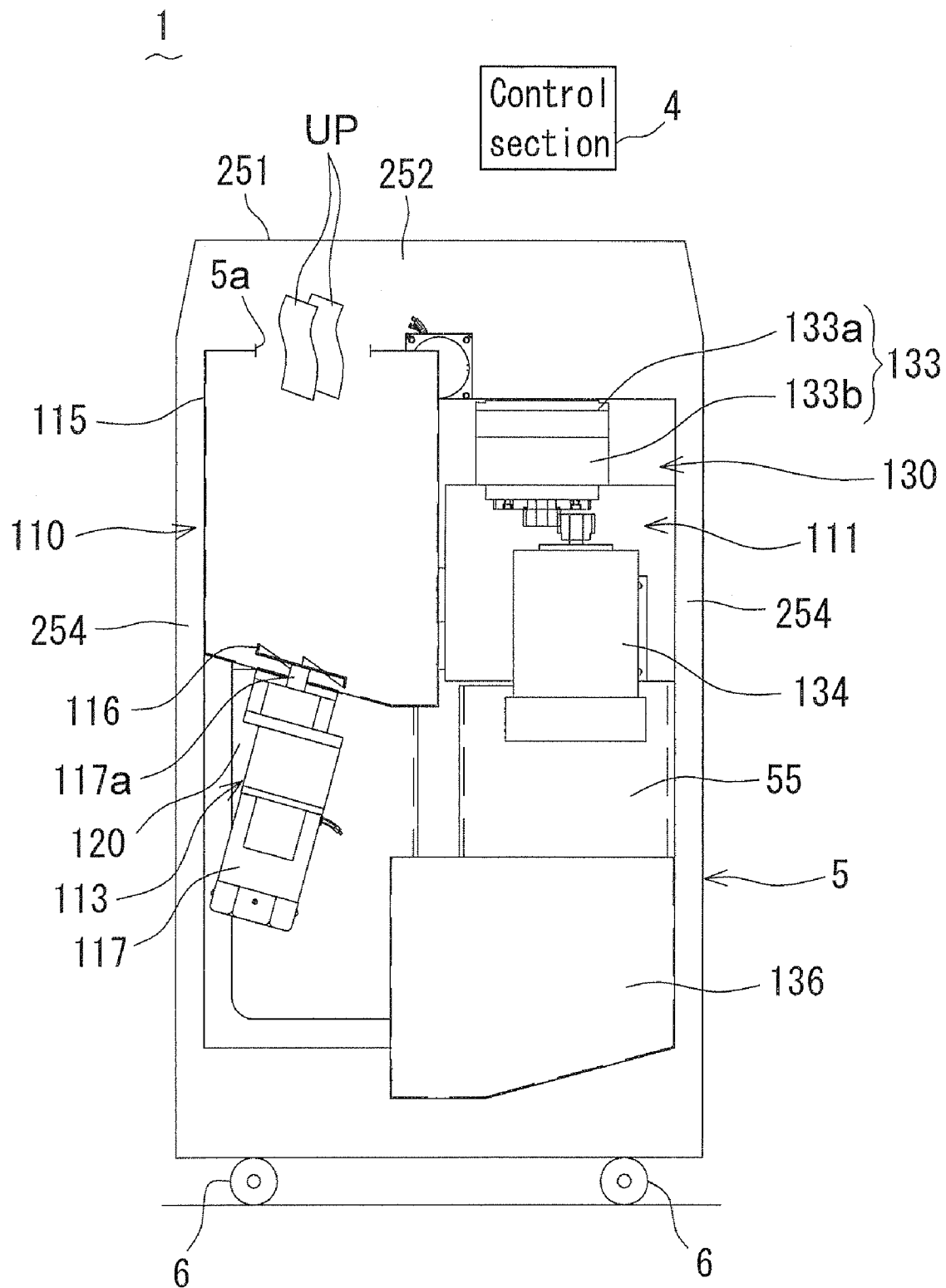
FIG. 7 is a side view of entire structure of the used paper recycling apparatus, showing a cut-open apparatus case.
Figure 9:
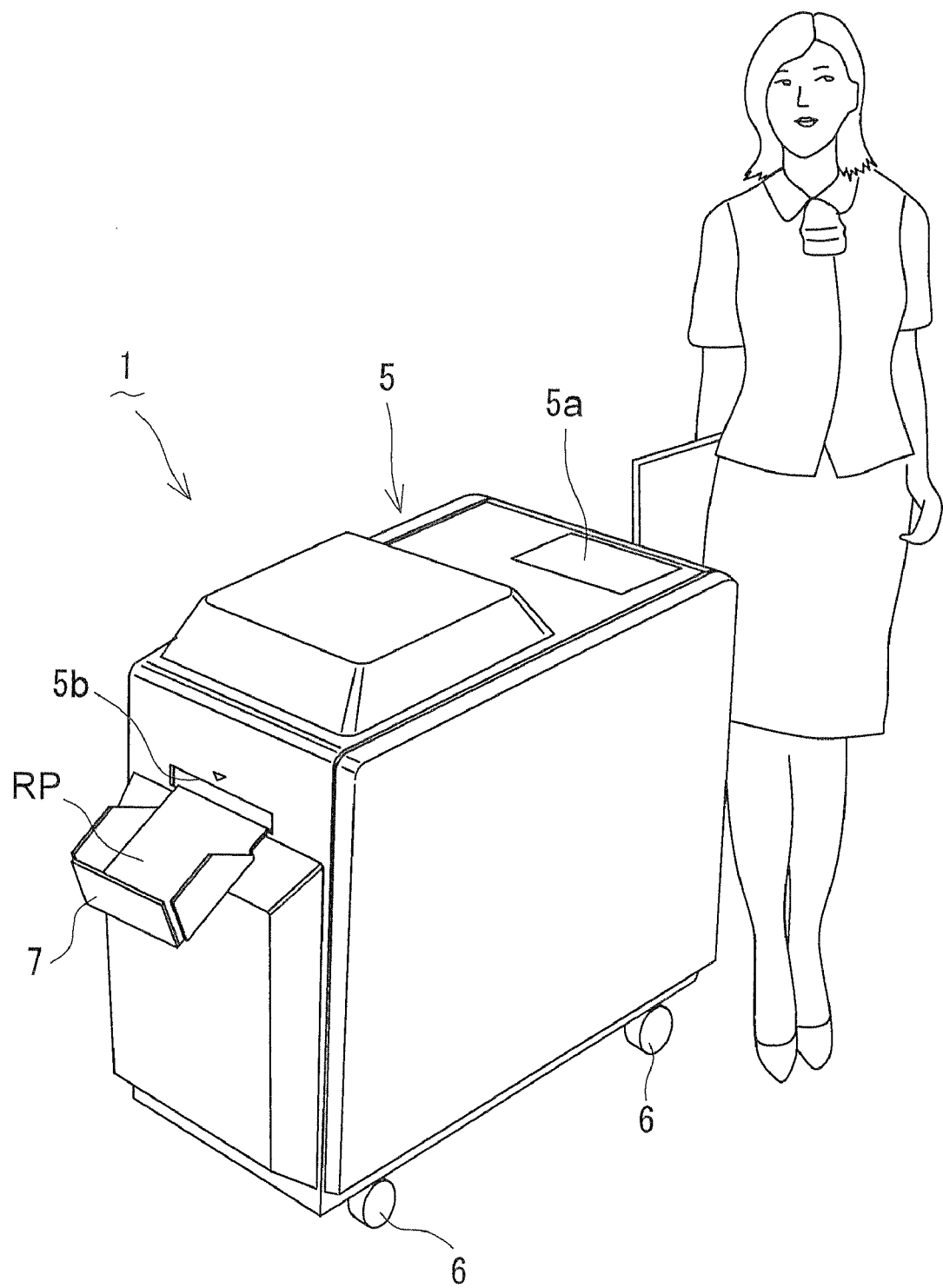
FIG. 9 is a perspective view of outline of a used paper recycling apparatus of the invention.

The used paper recycling apparatus 1 has a furniture size as shown in FIG. 9, that is, size and shape similar to office equipment, such as document rack, locker, desk, copier, or personal computer, and mainly comprises of a pulp making section (pulp making device) 2, a paper making section (paper machine) 3 as a principal component of the invention, and a control section 4 as shown in FIG. 6 and FIG. 7, and these sections 2 to 4 are contained in an apparatus case 5 in a compact design, and a drive source of the pulp making section 2 and paper making section 3 is a drive source driven by a general household alternating-current power source.

The apparatus case 5 has a furniture size as mentioned above, and the specific dimensions and shape are designed properly depending on the purpose and application. The apparatus case 5 in the illustrated preferred embodiment is a box having dimensions and shape like a copier used in an office, and its bottom is provided with casters 6, 6, . . . as moving means, and it is freely movable on the floor. In the ceiling of the apparatus case 5, an inlet 5a is provided for supplying used paper UP, and a detachable recycled paper receive tray 7 is provided in the side surface for receiving recycled paper RP, RP, . . . . A discharge port 5b of the apparatus case 5 is provided oppositely to the recycled paper receive tray 7, and recycled paper RP, RP, . . . discharged from the discharge port 5b are received sequentially in layers.

The paper making section (paper machine) 3 is a most important unit in the used paper recycling apparatus 1, and its components 10 to 12 have the following features in order to realize paper making for manufacturing recycled paper which was possible only in a huge used paper recycling plant hitherto in the apparatus case 5 of size and shape as small as a copier installed in a small office (furniture size).

The paper making section 3 is a process unit for manufacturing recycled paper RP from used paper pulp UPP manufactured in the pulp making section (pulp making device) 2 in a preceding process, and includes a paper making process unit 10, a dewatering roll unit 11, and a drying process unit 12.

Figure 2:
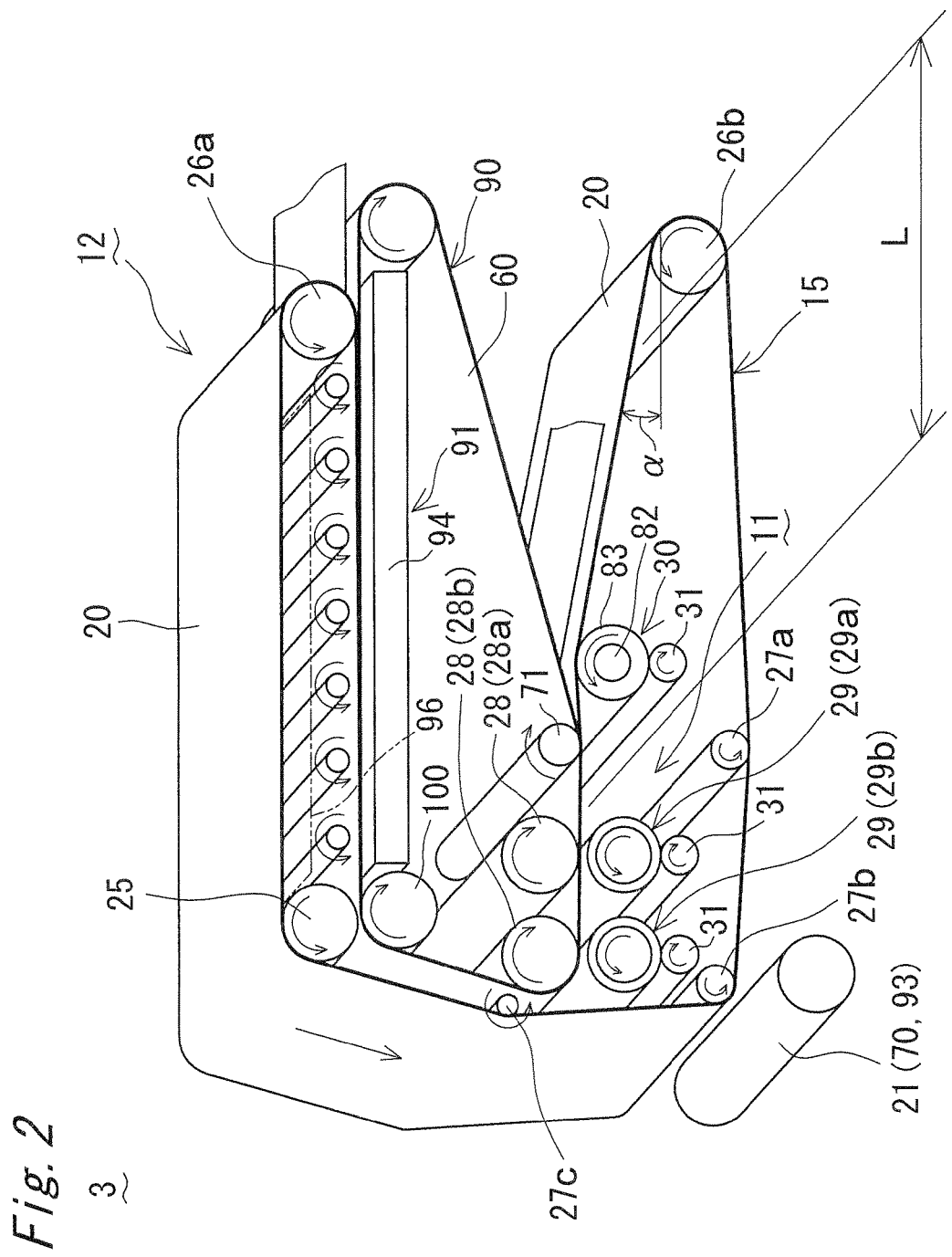
FIG. 2 is a perspective view of outline of principal parts of the paper making section.

The paper making process unit 10 and the drying process unit 12 are disposed in upper and lower layers as shown in FIG. 1, FIG. 2, and FIG. 6, and a processing conveyor 15 is provided along the overall length of the paper making process and drying process between the paper making process unit 10 and the drying process unit 12 in upper and lower layers. The paper making process unit 10 and the drying process unit 12 are specifically described below.

The paper making process unit 10 is a location for manufacturing wet paper from a slurry pulp suspension PS containing water W and used paper pulp UPP sent form the pulp making section 2, and is mainly composed of the processing conveyor 15 for composing a paper making conveyor, and a pulp feed unit 16.

The processing conveyor 15 has a mesh belt 20 of endless belt form, and a drive motor 21 for driving the mesh belt 20.

The processing conveyor 15 is designed to convey the pulp suspension while filtering and dewatering in the paper making process unit 10, and is formed as a net belt conveyor composed of the running mesh belt 20 of mesh structure having innumerable mesh cells for filtering and dewatering the pulp suspension PS. The mesh belt 20 is disposed to run straightly toward its running direction in the paper making section unit 10.

The mesh belt 20 is specifically an endless belt having plate members of mesh structure of specified width connected in a ring form of specified length.

Plate members of mesh structure for composing the mesh belt 20 are made of materials capable of filtering and dewatering the pulp suspension PS appropriately through innumerable mesh cells of mesh structure, and preferred examples include polypropylene (PP), polyethylene terephthalate (PET), polyamide (PA) (generally known by the registered trade name of Nylon), and stainless steel (SUS), and other materials excellent in corrosion resistance, and in the illustrated preferred embodiment, it is a PET mesh belt 20 excellent in heat resistance.

The mesh structure for composing the mesh belt 20 is preferred to be fine in meshes or smooth in weaving, and is specifically selected according to the characteristics of the paper to be processed, but in particular the following points are taken into consideration.

(1) Mesh Size of Mesh Belt 20

The mesh size of the mesh belt 20 is preferably 25 mesh cells to 80 mesh cells, and in the illustrated preferred embodiment, a mesh belt 20 of 50 mesh cells is used.

(2) Wire Diameter of Mesh of Mesh Belt 20

The mesh cells of the mesh belt 20 are determined not only by the number of mesh cells (size), but also by the wire diameter of mesh. At the same number of mesh cells, if the wire diameter is large, the mesh size is smaller, or if the wire diameter is small, the mesh size is larger, and it is expressed by the porosity of mesh, or the ventilation of degree of passing air ($cm^3/cm^2/sec$).

For example, when the mesh is fine and the ventilation is poor, the filtering rate is lower, and thereby a frame body 40 of the pulp feed unit 16 described below is extended in the running direction of the mesh belt 20, and the apparatus is increased in size. To the contrary, when the mesh is rough and the ventilation is too high, the frame body 40 is shorter and the apparatus is smaller in size, but the regenerated recycled paper RP is a rough paper, and the difference in smoothness between face and back sides is increased, and paper of poor smoothness is produced.

(3) Weaving Structure

The mesh weaving method of the mesh belt 20 includes single weaving, double weaving, changing of weft diameter and warp diameter, and other methods, but the mesh belt 20 of single weaving is used in the illustrated preferred embodiment because, as mentioned below, the multiple weaving causes to increase the diameter of the roll for rotating and supporting the mesh belt 20 and increase the size of the apparatus.

Considering these conditions, the mesh belt 20 is desired to be formed in a mesh structure of fine wire diameter of mesh, many number of mesh cells, and excellent in ventilation, so as to prevent the used paper pulp UPP from slipping out of the mesh of the mesh belt 20 in the paper making process, and the mesh belt 20 in the illustrated preferred embodiment is a plain woven PET mesh belt 20 of 50 mesh cells. According to this mesh belt 20, a paper quality sufficient for writing has been proved by experiment.

The width dimension of the mesh belt 20 is set at a specified width slightly larger than the width dimension of the recycled paper RP manufactured from the pulp suspension PS.

The mesh belt 20 runs, as shown in FIG. 1 and FIG. 2, straightly in the paper making process unit 10 toward the running direction, and runs straightly back and forth in opposite directions in the drying process unit 12 described later. The action of the mesh belt 20 in the drying process unit 12 is described later.

A specific drying and supporting structure of the mesh belt 20 is composed of a drive roller 25, driven rollers 26a, 26b, support rollers 27a to 27c, press rolls 28 (28a, 28b), dewatering rolls 29 (29a, 29b), and a preliminary dewatering roll 30, and it is rotatably supported and is driven by and coupled to the drive motor 21 by way of the drive roller 25.

In the paper making process unit 10, the paper making process length L of the mesh belt 20 is set within a range of a straight running direction length of the mesh belt 20 in the apparatus case 5 of furniture size (in the illustrated example, the lateral direction length FIG. 1, FIG. 2 and FIG. 6).

Specifically, the paper making process length L of the mesh belt 20 is set to be long enough for manufacturing an appropriate paper weight from the pulp suspension PS in relation between the filtering and dewatering rate of the mesh structure and the running speed of the mesh belt 20, and the processing conveyor 15 having the mesh belt 20 is set small enough to be contained within the apparatus case 5 of furniture size.

The running speed of the mesh belt 20 is determined in consideration of the above conditions, and is preferably set at 0.1 m/min to 1 m/min, and in the illustrated preferred embodiment it is set at 0.2 m/min. In the conventional large-scale used paper recycling plant, the running speed of this kind of paper making belt is at least 100 m/min or more, or more than 1000 m/min in faster version.

The running speed of the mesh belt 20 is particularly related to the weight of the wet paper in the paper making process, and the weight increases when the running speed of the mesh belt 20 decreases, and the weight decreases when the running speed increases. In this case, the mashing degree of the used paper pulp UPP is related to the filtering degree of the mesh belt 20, and a uniform weight is obtained when the mashing degree and the pulp concentration are constant.

In relation to these design conditions of the mesh belt 20, as shown in FIG. 1 and FIG. 2, the mesh belt 20 is disposed so as to run upward obliquely and straightly toward its running direction, and the paper making process length L can be extended considerably within a limited space of installation, and the filtering and dewatering rate is improved in relation to the mesh structure of the mesh belt 20, and the upward oblique angle α of the mesh belt 20 is determined depending on the purpose, and is preferably set at 3 degrees to 12 degrees, and it is set at 6 degrees in the illustrated preferred embodiment.

The drive motor 21 for driving the mesh belt 20 is specifically an electric motor, and is electrically connected to the control section 4. This drive motor 21 is used commonly as the running drive source for dewatering roll unit 11 and drying process unit 12 described later, and the structure for common use, that is, the drive coupling mechanism is realized in a generally known drive coupling mechanism, and the detailed description is omitted, and, for example, a drive coupling mechanism disclosed in Japanese Patent Application Laid-Open No. 2007-213450 may be favorably used.

The pulp feed unit 16 is a location for supplying the pulp suspension PS from the pulp making section 2 onto the mesh belt 20 of the processing conveyor (paper making conveyor) 15, and is installed at the start end position of the paper making process of the processing conveyor 15, and the pulp suspension PS is uniformly spread and supplied on the upside of the mesh belt 20.

Figure 4:
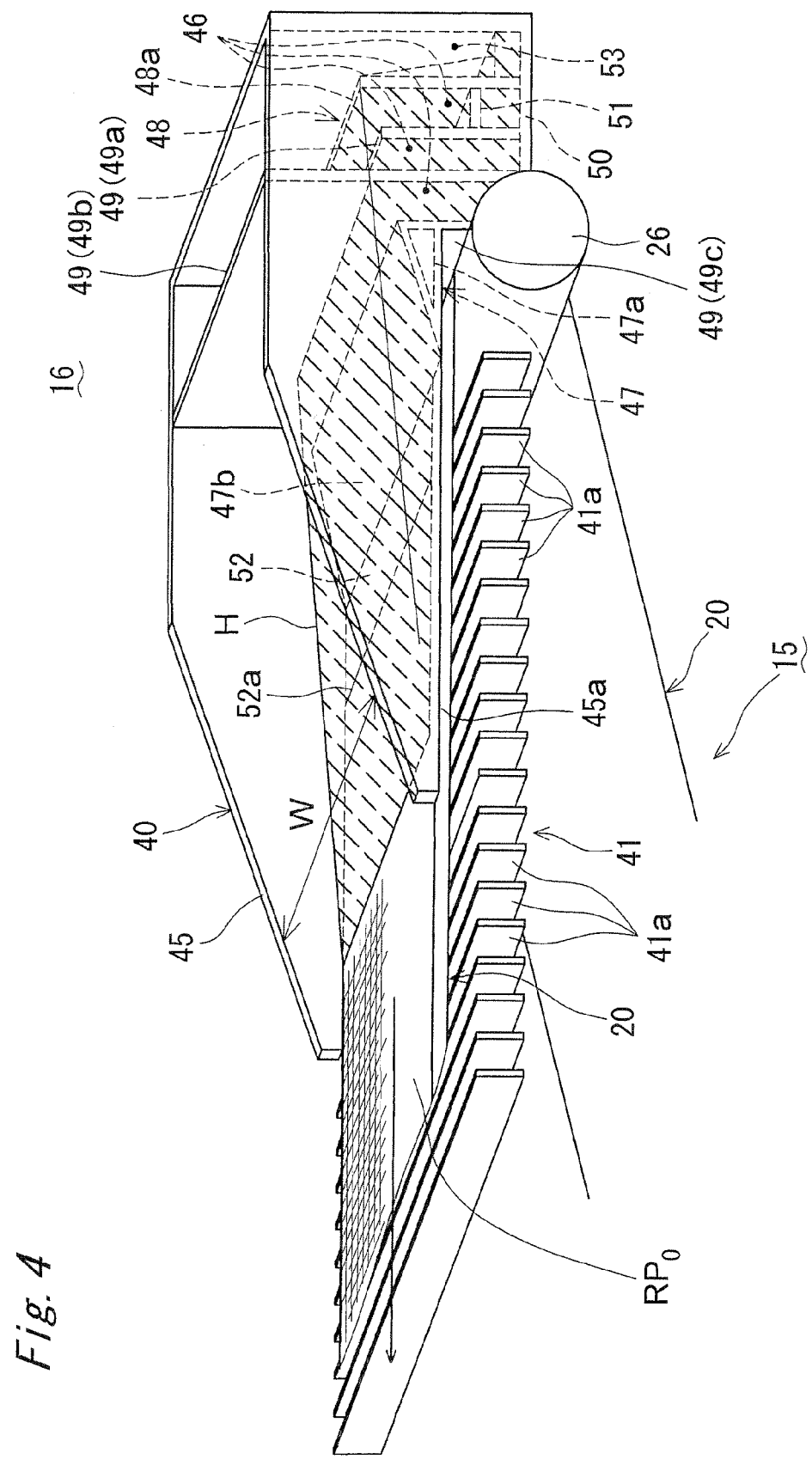
FIG. 4 is a perspective magnified view of a pulp feed unit of the paper making section.
Figure 5:
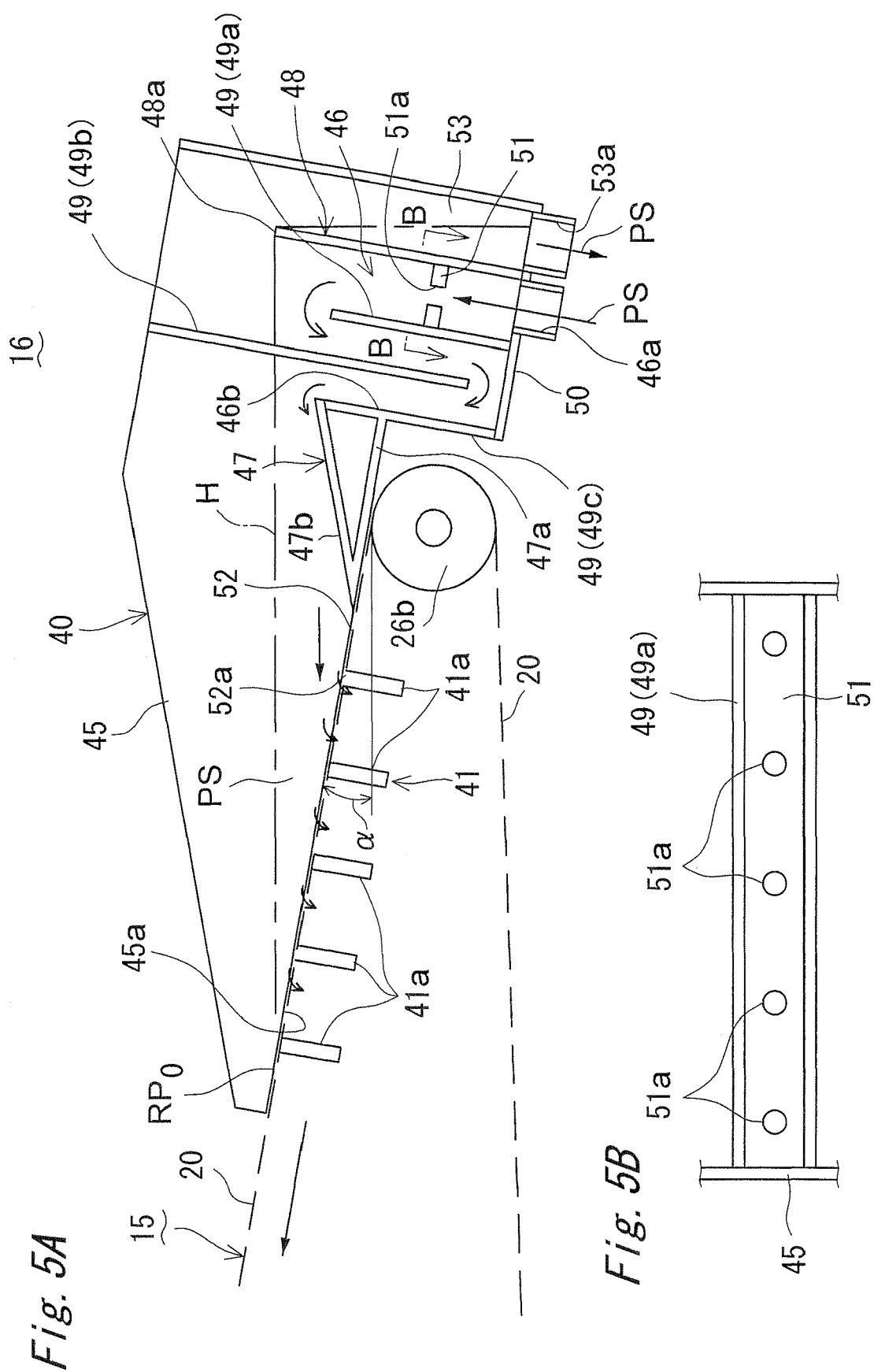
FIG. 5A is a front sectional view of structure of the pulp feed unit.
FIG. 5B is a sectional view along line B-B in FIG. 5A showing the structure of the pulp feed unit.

A specific structure of the illustrated pulp feed unit 16 is shown in FIG. 4, FIG. 5A and FIG. 5B. That is, in this pulp feed unit 16, the mesh belt 20 is disposed upward and obliquely toward the running direction as mentioned above, and a frame body 40 and a partition plate 41 are disposed at upper and lower side positions of the mesh belt 20.

The frame body 40 is disposed slidably on the upside of the mesh belt 20, and defines the supply width of the pulp suspension PS sent from the pulp making section 2, and as shown in FIG. 4, FIG. 5A and FIG. 5B, it includes a main body frame 45, a passage 46 provided inside of the main body frame 45, a flat plate member 47 disposed at the outside side position of the passage 46, and a overflow gate 48 provided at the rear end of the main body frame 45.

The main body frame 45 is formed in a flat U-shape opened at the leading end, that is, at the side part of the running direction of the mesh belt 20, and its lower end face 45a slides on the upside of the mesh belt 20 running obliquely, and the inner width dimension W of the main body frame 45 (see FIG. 4) is set according to the width dimension of the recycled paper RP to be manufactured.

The passage 46 is a meandering path for promoting uniform dispersion of the supplied pulp suspension PS, and is provided at the downstream side of the overflow gate 48 in the frame body 40.

Specifically, the passage 46 is composed of a plurality of gate members 49, 49, . . . provided in the main body frame 45, and in the illustrated preferred embodiment, the passage 46 is composed of a bottom plate 50 for forming the bottom of the main body frame 45, three gate members 49a, 49b, 49c erected in the main body frame 45, and the overflow gate 48.

As shown in FIG. 5A, more specifically, the three gate members 49a, 49b, 49c and the overflow gate 48 are erected parallel at specified equal intervals in the main body frame 45, and the passage 46 is bent and formed in vertical direction, and the advancing direction of the passage 46 is extended in upward direction from its inlet 46a, that is, from the opening made in the bottom plate 50, and is extended upward toward its outlet 46b (see arrow in FIG. 5B). The inlet 46a is communicating with a pulp feed tank 55 for supplying the pulp suspension PS.

Of the upright gate members 49a, 49b, and 49c in the main body frame 45, the gate member for partitioning the changing position from upward to downward direction of the passage 46, that is, the upper edge of the gate member 49a in the preferred embodiment is set to be located at a lower position than the water level of the pulp suspension PS flowing and staying on the flat plate member 47, that is, lower than the water level H defined by the overflow gate 48.

Near the inlet 46a of the passage 46, a partition plate 51 is provided to partition the passage 46, and this partition plate 51 is provided with a plurality of communication holes 51a, 51a, . . . at specified intervals as shown in FIG. 5B.

The flat plate member 47 is provided at a side position of the outlet 46b of the passage 46, and covers the mesh of the mesh belt 20 in closed state from the upper side. This flat plate member 47 is set and disposed at an oblique down slope in lower direction toward the running direction of the mesh belt 20.

Specifically, the flat plate member 47 is formed in a hollow plate frame having a triangular sectional contour as shown in the drawing together with the gate member 49c, and a lower side plate member 47a covers the mesh of the mesh belt 20 in closed state from the upper side, and an upper side plate member 47b is set and disposed at an oblique down slope in lower direction toward the running direction of the mesh belt 20.

The pulp suspension PS slowing passing this meandering passage 46 as indicated by arrow in FIG. 5A flows down from the outlet 46b of the passage 46 onto the upper side plate member 47b of the flat plate member 47, and stays up to a specific water level H defined by the overflow gate 48, and is uniformly diffused and supplied onto the upside of the mesh belt 20 running upward and obliquely to the running direction.

In this case, since the flat plate member 47 is provided in an oblique down slope in lower direction, the turbulent flow of the pulp suspension PS staying on the flat plate member 47 can be effectively prevented, and the texture of the recycled paper RP can be further enhanced.

That is, when the flat plate member 47 is in up slope, the pulp suspension PS flowing from the outlet 46b of the passage 46 onto the flat plate member 47 climbs up the flat plate member 47 and the flow of the pulp suspension PS may be turbulent, and if the pulp suspension PS staying on the flat plate member 47 is disturbed, adverse effects may occur in the texture of the recycled paper RP manufactured by the mesh belt 20.

In the preferred embodiment, considering this point, the flat plate member 47 is formed in down slope, and hence the pulp suspension PS flowing from the outlet 46b of the passage 46 onto the flat plate member 47 smoothly flows down on the upside of the flat plate member 47, and occurrence of turbulent flow is effectively prevented, and the texture of the recycled paper RP can be further enhanced.

In this relation, the partition member 41 has a louver structure capable of draining, being composed of a plurality of framework members 41a, 41a, . . . , and has a shape and dimension for slidably supporting the entire width of the lower side of the mesh belt 20.

The leading edge of the flat plate member 47 is provided with a thin guide sheet 52 for assuring smooth flow of the pulp suspension onto the mesh belt 20. The leading edge 52a of the guide sheet 52 is set at a position corresponding to the beam for forming the louver structure of the partition member 41, that is, one of the framework members 41a, 41a, . . . (final beam 41a in the preferred embodiment), and is specifically disposed to slide on the upside position of the mesh belt 20 supported by this beam 41a.

The overflow gate 48 is to keep constant the water level H of the pulp suspension PS staying in the frame body 40, and its upper edge 48a is formed in a horizontal straight state, and its height position is determined according to the various conditions of the mesh belt as mentioned above so as to maintain the weight of the wet paper $RP_0$ manufactured on the mesh belt 20, or the recycled paper RP stably at a desired value.

That is, in order to keep a stable weight of the wet paper $RP_0$ manufactured on the mesh belt 20, the stagnant action of pulp suspension PS in the frame body 40 is an important element, and this stagnant action is largely varied by the water amount (stagnant amount) of the pulp suspension PS in the frame body 40. It is hence extremely important to keep constant the water amount of the pulp suspension PS.

In this pulp feed unit 16, since the overflow gate 48 is provided, the water amount of pulp suspension PS in the frame body 40 can be maintained stably.

In addition, since the overflow gate 48 is provided at the inlet side position of the passage 46, that is, at the upstream side, instead of the outlet side position of the passage 46, pulsation phenomenon of water level H of pulp suspension PS can be effectively prevented.

If the overflow gate 48 is provided at the outlet side position of the passage 46, when the pulp suspension PS is filtered by the mesh structure of the mesh belt 20 and the water level H is lowered, there is a time lag until the pulp suspension PS leaving the outlet 46b of the passage 46 rides over the overflow gate 48, and hence the water level H pulsates, and stripe patterns may be formed in the texture of the recycled paper RP.

By contrast, as in the illustrated preferred embodiment, since the overflow gate 48 is provided at the upstream side of the passage 46, such troubles may be effectively avoided.

At the rear side of the overflow gate 48, a pulp suspension recovery unit 53 formed on the overflow gate 48 and the rear wall portion of the main body frame 45 is provided. The pulp suspension PS overflowing from the overflow gate 48 flows down and is collected in the pulp suspension recovery unit 53, and is collected into a white water recovery tank 120 from a discharge port 53a opened in the bottom plate 50.

At the upstream side of the pulp feed unit 16, there is a pulp feed tank 55 for supplying the pulp suspension PS into the pulp feed unit 16.

In the pulp feed tank 55, the pulp suspension PS manufactured in the pulp making section is supplied and stored.

The level of the pulp suspension PS stored in the pulp feed tank 55 is detected by liquid level detecting means such as float switch not shown, and it is continuously supplied into the frame body 40 of the pulp feed unit 16 by the suspension feed pump.

When the pulp suspension PS stored in the pulp feed tank 55 is supplied in the passage 46 in the frame body 40 from the inlet 46a by the suspension feed pump, it slowly passes through the meandering passage 46 as indicated by arrow in FIG. 5A, and flows onto the flat plate member 47 from the outlet 46b, and stays up to the specified water level H defined by the overflow gate 48, and is uniformly diffused, spread and supplied on the upside of the mesh belt 20 running in upward oblique state toward the running direction.

In this case, a partition plate 51 is provided to partition the passage 46, and this partition plate 51 is provided with a plurality of communication holes 51a, 51a, . . . , and when the pulp suspension PS supplied from the pulp feed tank 55 passes through the plurality of communication holes 51a, 51a, . . . of the partition plate 51, it is dispersed in the entire passage 46, and is adjusted so that the flow rate may be uniform in the entire section opening of the passage 46.

The pulp suspension PS uniformly diffused on the upside of the mesh belt 20 is conveyed together with the mesh belt 20 while maintaining a specified width dimension defined by the main body frame 45 by the running action of the mesh belt 20 in the arrow direction, and is filtered and dewatered by the own weight of the mesh of the mesh belt 20 to become wet paper $RP_0$. The white water W resulting from filtering and dewatering (pulp water of extremely low concentration filtered by the mesh in the paper making process) is collected as mentioned above in the white water collect tank 120 of a water feed unit 114 described later.

On the other hand, the pulp suspension PS collected in the pulp suspension collect unit 53 by overflowing from the overflow gate 48 is also collected in the white water collect tank 120 as mentioned above.

In the pulp feed unit 16, the running style of the mesh belt 20 is lateral and horizontal, that is, it is supported so that the upside contour line at the section perpendicular to the running direction of the mesh belt 20 may be in horizontal stat. In such configuration, by cooperation of the main body frame 45 and the partition member 41, bias of staying state of pulp suspension PS in lateral width direction is prevented effectively, and the adjusted thickness of the wet paper $RP_0$ is uniform in lateral width direction, and hence the thickness of the entire paper surface becomes uniform.

The dewatering roll unit 11 is a location for squeezing and dewatering the wet paper $RP_0$ on the mesh belt 20 at the junction of the paper making process unit 10 and drying process unit 12 described below. Specifically, the mesh belt 20 and the smooth surface belt 60 at the drying process unit 12 are rolled and squeezed by pressing from upper and lower sides, and the wet paper $RP_0$ on the mesh belt 20 is squeezed and dewatered.

That is, the paper making process unit 10 at the upstream side and the drying process unit 12 at the downstream side are disposed in upper and lower layers as shown in FIG. 1, FIG. 2 and FIG. 6, and at the junction of the paper making process unit 10 and drying process unit 12, the upper and lower adjacent portions of the smooth surface belt 60 of the drying process unit 12 at the downstream side and the mesh belt 20 of the paper making process unit 10 at the upstream side are mutually linked, and the dewatering roll unit 11 rolls and squeezes the mesh belt 20 and smooth surface belt 60 by pressing from upper and lower sides.

The processing conveyor 15 composed of the mesh belt 20 is extended along the overall length of the paper making process and drying process in the paper making process unit 10 and drying process unit 12 in the upper and lower layers, and it functions as paper making conveyor as mentioned above at the paper making process unit 10, and cooperates with the smooth surface belt 60 mentioned below at the drying process unit 12, and conveys the wet paper $RP_0$ while pressing from upper and lower sides.

The dewatering roll unit 11 includes two sets (28a, 29a, and 28b, 29b) of a pair of upper and lower press rolls 28, and a dewatering roll 29, and a drive motor 70, and a preliminary dewatering roll 30 and a slurry preventive roll 71 are provided as auxiliary functions.

The dewatering rolls 29 (29a, 29b) roll and contact on the mesh belt 20 from the lower side, and specifically a dewatering layer 81 of porous material having fine continuous pores is wound around the outer circumference of a cylindrical roll 80 of high rigidity material. The dewatering layer 81 is formed of a material excellent in hydrophilic property, water absorbing property and water retaining property, and is preferably formed of a porous material having fine continuous pores excellent in flexibility. The winding structure of the dewatering layer 81 on the cylindrical roll 80 includes single winding of a relatively thick dewatering layer 81 on the outer circumference of the cylindrical roll 80, single-layer winding of a cylindrical dewatering roll 81 on the outer circumference of the cylindrical roll 80, or multi-layer structure of winding a thin dewatering layer 81 in plural turns on the outer circumference of the cylindrical roll 80.

The dewatering rolls 29 (29a, 29b) in the illustrated preferred embodiment are formed in a single-layer structure having a cylindrical dewatering layer 81 of a foamed material having superfine continuous pores of micron size wound around the outer circumference of a cylindrical roll 80 of stainless steel.

The press rolls 28 (28a, 28b) roll and press the smooth surface belt 60 at the drying process unit 12 described below from the upper side, and are specifically made of cylindrical rolls of high rigidity material. The press rolls 28 (28a, 28b) in the illustrated preferred embodiment are cylindrical rolls of stainless steel.

These dewatering rolls 29 (29a, 29b) and press rolls 28 (28a, 28b) are specifically driven by and coupled to a single drive motor 70, ad the both dewatering rolls 29 (29a, 29b) and press rolls 28 (28a, 28b) are driven at same rotating speed in cooperation.

The drive motor 70 in the illustrated preferred embodiment is used commonly with the drive motor 21 for the paper making process unit 10 as described below.

By driving of the drive motor 70 (21), the both rolls 29 (29a, 29b) and 28 (28a, 28b) roll and squeeze the both belts 20, 60 from the upper and lower sides in pressed state, and moisture M contained in the wet paper $RP_0$ on the mesh belt 20 is absorbed and dewatered by the dewatering rolls 29 (29a, 29b) through the mesh belt 20. The squeezed and dewatered white water W is collected in the white water collect tank 120 of the water feed unit 114.

A specific mechanism of squeezing and dewatering is explained by referring to FIG. 3A, showing an example of a principal set of a pair of press roll 28a and dewatering roll 29a of the dewatering roll unit 11, and by rotation of both rolls 29a and 28a, the mesh belt 20 and smooth surface belt 60 having the wet paper $RP_0$ mounted on the upside are guided in between the rolls 29a, 28a with the wet paper $RP_0$ interposed between them, and rolled and squeezed from the upper and lower sides in pressed state. As a result, the moisture M contained in the wet paper $RP_0$ is squeezed out to the upstream side of the both rolls 29a, 28a (the right side in the drawing), but since the smooth surface belt 60 of the upper side has a smooth surface not having pores, the squeezed moisture M entirely passes through fine continuous pores in the mesh belt 20 at the lower side, and is absorbed in the dewatering layer 81 of the dewatering roll 29a.

The dewatering rolls 29 (29a, 29b) of the preferred embodiment are provided with a draining roll 31 in a free rolling state.

The draining roll 31 is for squeezing and discharging the moisture contained in the dewatering layer 81 of the dewatering rolls 29, and is formed in a cylindrical roll of small diameter made of high rigidity material, and is pressed to roll on the outer circumference of the dewatering rolls 29.

Along with rotation of the dewatering rolls 29, the draining roll 31 rolls on and presses the dewatering layer 81 of the dewatering rolls 29, and the moisture absorbed in the dewatering layer 81 is squeezed and drained.

By such configuration, the further mashed used paper pulp UPP is inferior in filtering and dewatering property, and the moisture cannot be easily removed from the mesh belt 20, and the draining roll 31 is provided to assist the dewatering rolls 29, and the draining amount of the dewatering layer 29 is substantially increased, and the squeezing and dewatering action in the dewatering roll unit 11 is effectively expressed.

Owing to the same purpose, the preliminary dewatering roll 30 mentioned below is also provided with a draining roll 31.

The preliminary dewatering roll 30 and slurry preventive roll 71 are provided to assist the squeezing and dewatering action of the press roll 28a and dewatering roll 29a in the dewatering roll unit 11.

The preliminary dewatering roll 30 is disposed, as shown in FIG. 1 and FIG. 2, so as to apply tension to the mesh belt 20 by rolling from the lower side at the upstream side of the dewatering roll unit 11.

The preliminary dewatering roll 30 is similar to the dewatering rolls 29 (29a, 29b) in its specific structure, and is composed of a cylindrical roll 82 of high rigidity material, and a dewatering layer 83 of porous material having fine continuous pores wound on the outer circumference thereof. The preliminary dewatering roll 30 in the illustrated preferred embodiment is a single layer structure, that is, a cylindrical dewatering layer 83 of fine porous continuous foamed material having micron-size ultrafine continuous pores is fitted to the cylindrical outer circumference of the stainless steel cylindrical roll 82.

The wet paper $RP_0$ uniformly diffused on the upside of the mesh belt 20 and conveyed together with the mesh belt 20 is filtered and dewatered by the mesh belt 20, and is also absorbed and dewatered comprehensively by the preliminary dewatering roll 30, and the squeezing and dewatering action of the press rolls 28 (28a, 28b) and dewatering rolls 29 (29a, 29b) is assisted preliminarily.

The slurry preventive roll 71 is disposed, as shown in FIG. 1, FIG. 2 and FIG. 3B, so as to press the smooth surface belt 60 to the wet paper $RP_0$ on the mesh belt 20 at the lower side, by rolling and pressing the smooth surface belt 60 from the upper side, near the upstream side of the dewatering roll 11.

Referring now to FIG. 3B, when the mesh belt 20 and smooth surface belt 60 having the wet paper $RP_0$ mounted on the upside is rolled and squeezed from the upper and lower sides in pressed state by the dewatering rolls 29 (29a, 29b) and the press rolls 28 (28a, 28b), the moisture M contained in the wet paper $RP_0$ is squeezed out to the upstream side (right side in the drawing) of the both rolls 29 (29a, 29b), 28 (28a, 28b), and at the same time the moisture M held as a result of previous squeezing and dewatering of the dewatering rolls 29 (29a, 29b) is also squeezed.

In this case, if the slurry preventive roll 71 is not provided, as shown in FIG. 3A, near the upstream side of the both rolls 29 (29a, 29b), 28 (28a, 28b), particularly near the upstream side of the set of a pair of press roll 28a and dewatering roll 29a, the intersecting angle of the smooth surface belt 60 at the upper side and the mesh belt 20 at the lower side (the angle enclosed as intersection of pressing points of both rolls 29 (29a, 29b), 28 (28a, 28b) by the both belts 20, 60) is relatively large, and hence the smooth surface belt 60 at the upper side is departed from the wet paper $RP_0$ on the mesh belt 20 at the lower side. Hence, part M' of the total moisture M of the moisture contained in the wet paper $RP_0$ squeezed to the upstream side of the both rolls 29 (29a, 29b), 28 (28a, 28b) and moisture held in the dewatering rolls 29 (29a, 29b) is not absorbed by the dewatering rolls 29 (29a, 29b) through the endless belt 20, but may be absorbed in the wet paper $RP_0$, and the wet paper $RP_0$ may return to the state of slurry.

Meanwhile, if the intersecting angle of the smooth surface belt 60 at the upper side and the mesh belt 20 at the lower side is not so large, such problem does not occur, and the slurry preventive roll 71 may be omitted.

The wet paper $RP_0$ squeezed and dewatered by the dewatering roll unit 11 is held between the upside of the mesh belt 20 of the lower side and the downside of the smooth surface belt 60 at the upper side, and is conveyed together with these belts 20, 60, and is dried at the drying process unit 12.

At the downstream side position of the dewatering roll unit 11, that is, at the start end of the drying process unit 12, as shown in FIG. 1 and FIG. 2, the downside mesh belt 20 from the paper making process unit 10 is folded over to the opposite side, and is moved straightly in parallel and closely together with the smooth surface belt 60, and the wet paper $RP_0$ is held between the both belts 20, 60, and is transferred smoothly from the paper making process unit 10 and the drying unit 12 without causing defective transfer of wet paper $RP_0$ or crease or tear of wet paper $RP_0$.

That is, as disclosed in Japanese Patent Application Laid-Open No. 2007-213450, if the mesh belt 20 is used exclusively for the paper making process unit 10, and is composed to run separately in the opposite direction, that is, in the downside direction, at the downstream side position of the smooth surface belt 60 of the drying process unit 12 and the dewatering roll unit 11, the wet paper $RP_0$ is, at this position, peeled off from the downside mesh belt 20, and is attracted and transferred to the upside smooth surface belt 60.

This attracting and transfer action is considered to be caused by the smooth surface structure of the smooth surface belt 60, that is, the surface of the downside mesh belt 20 has a fine undulation surface opening multiple fine continuous pores, while the surface of the upside smooth surface belt 60 has a smooth surface not having pores, and hence the wet paper $RP_0$ slightly containing moisture is considered to be attracted by the surface tension against the surface of the smooth surface belt 60.

Thus, a stripping force for transfer by attracting force of the smooth surface belt 60 is applied to the wet paper $RP_0$ on the mesh belt 20, but if this stripping force is not applied uniformly on the surface of wet paper $RP_0$, it may lead to defective transfer of the wet paper $RP_0$ or crease or tear of the paper. Since the running speed of the both belts 20, 60 cannot absorb the elongation of the wet paper occurring when transferring of completely identical in speed, and it is necessary to provide with a speed difference between the both belts 20, 60 as advancing to next process.

By contrast, as in the apparatus, the wet paper $RP_0$ is transferred from the paper making process unit 10 to the drying process unit 12 in a state being held and fixed by upper and lower belts 20, 60 running closely from the upper and lower sides, the wet paper $RP_0$ can be transferred smoothly without causing defective transfer of the wet paper $RP_0$ or crease or tear of wet paper $RP_0$, without requiring temperature difference between the both belts 20 and 60.

The drying process unit 12 is a location for obtaining a recycled paper RP by drying the wet paper $RP_0$ squeezed and dewatered in the dewatering roll unit 11 after the paper making process in the paper making process unit 10, and is disposed at an upper layer on the paper making unit process 10, and is mainly composed of a drying conveyor 90 and a heating and drying unit 91.

The drying conveyor 90 is for smoothly drying and conveying the wet paper $RP_0$ squeezed and dewatered in the dewatering roll unit 11, and includes the smooth surface belt 60 and a drive motor 93 for driving this smooth surface belt 60.

The drying conveyor 90 is formed as a smooth belt conveyor for driving the smooth surface belt 60 having a smooth surface for smoothing the wet paper $RP_0$ manufactured in the paper making process unit 10.

As mentioned above, the processing conveyor 15 is extended and provided along the overall length of the paper making process and drying process in the paper making process unit 10 and drying process unit 12 formed in upper and lower layers, and cooperates with the drying conveyor 90 in the drying process unit 12 for smoothing and conveying the wet paper $RP_0$.

For this purpose, the smooth surface belt 60 is specifically formed as an endless belt having a smooth surface plate member of specified width connected in a ring form of specified length, and as shown in FIG. 1, FIG. 2 and FIG. 6, it runs along the lower side of the running path of the mesh belt 20 of the processing conveyor 15, and cooperates with the mesh belt 20 to convey the wet paper $RP_0$ by pressing from the upper and lower sides.

The specified width of the smooth surface belt 60 is, same as the mesh belt 20, set at a slightly larger size than the width of the recycled paper RP to be manufactured. The plate member of smooth surface structure is a material capable of finishing one side of the wet paper $RP_0$ to an appropriate smooth surface, and withstanding the heating action by a heating and drying unit 91 in a later process, and is preferably formed of fluoroplastic resin, stainless steel, or other flexible heat resistant material, and a fluoroplastic resin belt is used in the illustrated preferred embodiment. The specified length is long enough to heat and dry the wet paper $RP_0$ to a completed product of recycled paper RP, and is small enough to be contained in the space of the drying process unit 12 in the apparatus case 5.

The smooth surface belt 60 is, as shown in FIG. 1 and FIG. 2, composed of a drive roller 100, driven roller 101, press rolls 28 (28a, 28b), dewatering rolls 29 (29a, 29b), a support roll 27c, and a slurry preventive roll 71, and it is rotatably supported and is driven by and coupled to the drive motor 93 by way of the drive roller 100.

That is, the smooth surface belt 60 is formed in a support structure common to the mesh belt 20 from the paper making process unit 10 along the overall length of the drying process, and is disposed to run straightly and closely in parallel together with the mesh belt 20.

The drive motor 93 for driving the smooth surface belt 60 is used commonly as the running drive source for the processing conveyor 15 and the dewatering roll unit 11, and the structure for common use, that is, the drive coupling mechanism is realized in a generally known drive coupling mechanism, and the detailed description is omitted, and, for example, a drive coupling mechanism disclosed in Japanese Patent Application Laid-Open No. 2007-213450 may be favorably used.

The heating and drying unit 91 is a location of heating and drying the wet paper $RP_0$ held and conveyed by the mesh belt 20 and smooth surface belt 60, and is specifically designed to heat the smooth surface belt 60 conveying and supporting the lower side of the wet paper $RP_0$ by a heater 94.

The heater 94 in the illustrated preferred embodiment is formed as a heater plate contacting with the opposite side of the conveying and supporting side of the wet paper $RP_0$ in the smooth surface belt 60, and is provided in a horizontal running portion in the running path of the smooth surface belt 60, and is disposed to contact with the opposite side of the upside of the holding surface of the wet paper $RP_0$ in the smooth surface belt 60, that is, at the downside. As a result, the wet paper $RP_0$ on the smooth surface belt 60 is heated indirectly by the smooth surface belt 60 heated by the heater plate 94.

In the drying process unit 12, pressing means 95 is provided in the running path between the mesh belt 20 and the smooth surface belt 60 for pressing these belts 20, 60 with a uniform pressure.

This pressing means 95 is disposed oppositely to the heater plate 94 in the horizontal running portion in the running path of the belts 20, 60, and is specifically provided with a plurality of (seven in the illustrated preferred embodiment) pressing rollers 95a, 95a, . . . disposed at specified small pitches in the running direction. These pressing rollers 95a, 95a, . . . formed in a cylindrical roll of small diameter made of high rigidity material.

In the drying process unit 12, the lower side surface of the wet paper $RP_0$ is conveyed and supported by the smooth surface belt 60, and its upper side surface is conveyed and supported by the mesh belt 20, and the plurality of pressing rollers 95a, 95a, . . . of small diameter disposed at fine pitches are designed to press the upper side of the mesh belt 20 with a uniform pressure.

As a result, the wet paper $RP_0$ held and conveyed by the both belts 20, 60 is sequentially rolled and pressed by the pressing rollers 95a, 95a, . . . , and the opposite side surface of one side of the wet paper $RP_0$ contacting with the surface of the smooth surface belt 60, that is, the surface of the mesh belt 20 side of the wet paper $RP_0$ is finished to a proper smooth surface by way of the mesh belt 20. Also by a proper ventilation of the mesh belt 20, the wet paper $RP_0$ becomes a dry paper.

The number of the pressing rollers 95*a*, 95*a*, . . . may be properly increased or decreased depending on the purpose.

At the corresponding position of the heater plate 94 of the drying process unit 12, that is, at the location of the pressing rollers 95*a*, 95*a*, . . . , a cover 96 is provided for controlling the ventilation of the mesh belt 20 for conveying and supporting the upper side surface of the wet paper $RP_0$. As a result, a desired ventilation of the mesh belt 20 is obtained, and the surface of the wet paper $RP_0$ is uniformly dried, crease is rarely formed.

The heating and drying unit 91 at the drying process unit 12 of the paper making section 3 is provided with a steam collect unit 250 for collecting the steam generated by heating and drying.

As shown in FIG. 6 and FIG. 7, the steam collect unit 250 includes a steam collect chamber 252 formed in the cover of the apparatus case 5, that is, in part of a decorative case cover 251, and an exhaust fan 253 for exhausting the steam collect chamber 252.

Specifically, an exhaust duct 254 is provided to communicate with the white water collect tank 120 of the water feed unit 114 along the inner side of the decorative case cover 251 from the steam collect chamber 252.

In the heating and drying unit 91, therefore, the steam generated by the heating and drying action is collected in the steam collect chamber 252 by the exhaust action of the exhaust fan 253, and is circulated into the white water collect tank 120 by way of the exhaust duct 254.

At the downstream side of the heating and drying unit 91 at the both belts 20, 60, as shown in FIG. 1, a stripping member 97 is provided. This stripping member 97 is an elastic spatula having heat resistance, and the stripping member 97 in the illustrated preferred embodiment is coated with Teflon (registered trademark) on the outer circumference of an elastically deformable stainless steel plate of about 0.1 to 0.13 mm in thickness, and its base end is supported at the fixed side (not shown), and its leading end edge 97*a* is elastically stopped on the surface of the smooth surface belt 60.

The recycled paper RP dried and conveyed on the smooth surface belt 60 is sequentially stripped off from the holding surface of the smooth surface belt 60 by the leading end edge 97*a* of the stripping member 97.

In this relation, the downstream side of the stripping member 97, that is, the terminal end position of the running path of the both belts 20, 60, or the terminal end position of the drying process unit 12 is provided with a fixed size cutter 101 for cutting the recycled paper RP stripped from the smooth surface belt 60 to a specified size.

The fixed size cutter 101 is designed to cut the recycled paper RP stripped from the smooth surface belt 60 to a specified width and a specified length to form into a specified rectangular size. Specifically, the fixed size cutter 101 includes a roll slitter 101*a* for cutting the recycled paper RP in width direction to align the width size, and a so-called guillotine cutter 101*b* for cutting the recycled paper RP in length direction to align the length size, and these elements are driven by a drive motor 101*c*.

The recycled paper RP stripped from the smooth surface belt 60 is cut into a specified rectangular size (A4 format in the illustrated preferred embodiment) by the fixed size cutter 101, and the reusable recycled paper RP of specified size is discharged from the outlet 5*b* of the apparatus case 5.

In succession, the pulp making section 2 (pulp making device) in the preceding process of the paper making section 3 is specifically described below.

The pulp manufacturing section 2 is, as shown in FIG. 6 and FIG. 7, a location for manufacturing used paper pulp by macerating and mashing used paper UP, and is composed of a macerating unit 110 for agitating, grinding, and macerating the used paper UP, a mashing unit 111 for mashing the used paper UP macerated in the macerating unit 110, and a pulp concentration adjusting unit 112 for adjusting the concentration of the macerated and mashed used paper pulp UP, and in the illustrated preferred embodiment, the macerating unit 110 and mashing unit 111 circulate the used paper UP for a specified time.

The macerating unit 110 includes an agitating device 113 for agitating the used paper UP, and a water feed unit 114 for supplying water into the agitating device 113.

The agitating device 113 includes an agitating tank 115, an agitating impeller 116, and a drive motor 117. The agitating tank 115 is shown in FIG. 7, in which a closable inlet 5*a* is provided outside of the apparatus case 5 in the ceiling wall, and the agitating impeller 116 is rotatably provided in the inside. The inner volume of the agitating tank 115 is determined depending on the number of sheets of used paper UP to be agitated in batch. In the illustrated preferred embodiment, the agitating tank 115 is supposed to agitate about 8 sheets (about 132 g) of used paper UP of A4 format plain paper copier (PPC) in batch process by adding about 1.5 liters of water.

The agitating impeller 116 is provided in an inclined bottom of the agitating tank 115, and is driven by and coupled to a rotary shaft 117*a* of a drive motor 117, and is rotated normally and reversely by the drive motor 117 continuously or intermittently. The drive motor 117 is specifically an electric motor, and the drive motor 117 is electrically connected to the control section 4.

When the agitating impeller 116 is rotated normally and reversely, the used paper UP, if agitated in the size of A4 format, is effectively dispersed by the jet action of water by normal rotation followed by reverse rotation of the agitating impeller 116, and entangling on the agitating impeller 116 can be effectively prevented, and the used paper UP, UP, . . . can be macerated and mashed uniformly.

The water feed unit 114 is composed of white water collect tank 120 and water feed pump (not shown). The white water collect tank 120, as mentioned above, collects white water filtered and dewatered in the paper making section 3 (pulp water of ultralow concentration filtered by the mesh in the paper making process), and the white water W collected in the white water collect tank 120 is supplied as water for agitation into the agitation tank 115 of the agitating device 113 by the water feed pump as described below.

The water feed unit 114 also functions, as described below, as concentration adjusting water feeder (concentration adjusting water feeding means) of pulp concentration adjusting device (pulp concentration adjusting means) 112, and for this purpose, moreover, a concentration adjusting water feed pump (not shown) is provided for supplying the white water W in the white water collect tank 120 into the concentration adjusting tank 136 as water for adjusting the concentration.

In the agitating device 113, the used paper UP, UP, . . . supplied into the agitating tank 115 from the opening or inlet 5*a* of the apparatus case 5 is agitated for a specific time (3 to 5 minutes in the shown case) in water W supplied from the water feed unit 114 by normal and reverse rotation of the agitating impeller 116 by the drive motor 117, and macerated and mashed, and transformed into used paper pulp UPP.

The mashing unit 111 has at least one mashing machine, and one mashing machine 130 is shown in the illustrated preferred embodiment.

The mashing machine 130 pressurizes and mashes the used paper UP macerated in the macerating unit 110, and grinds and pulverizes the inks forming characters and patterns on the used paper UP.

Figure 8:
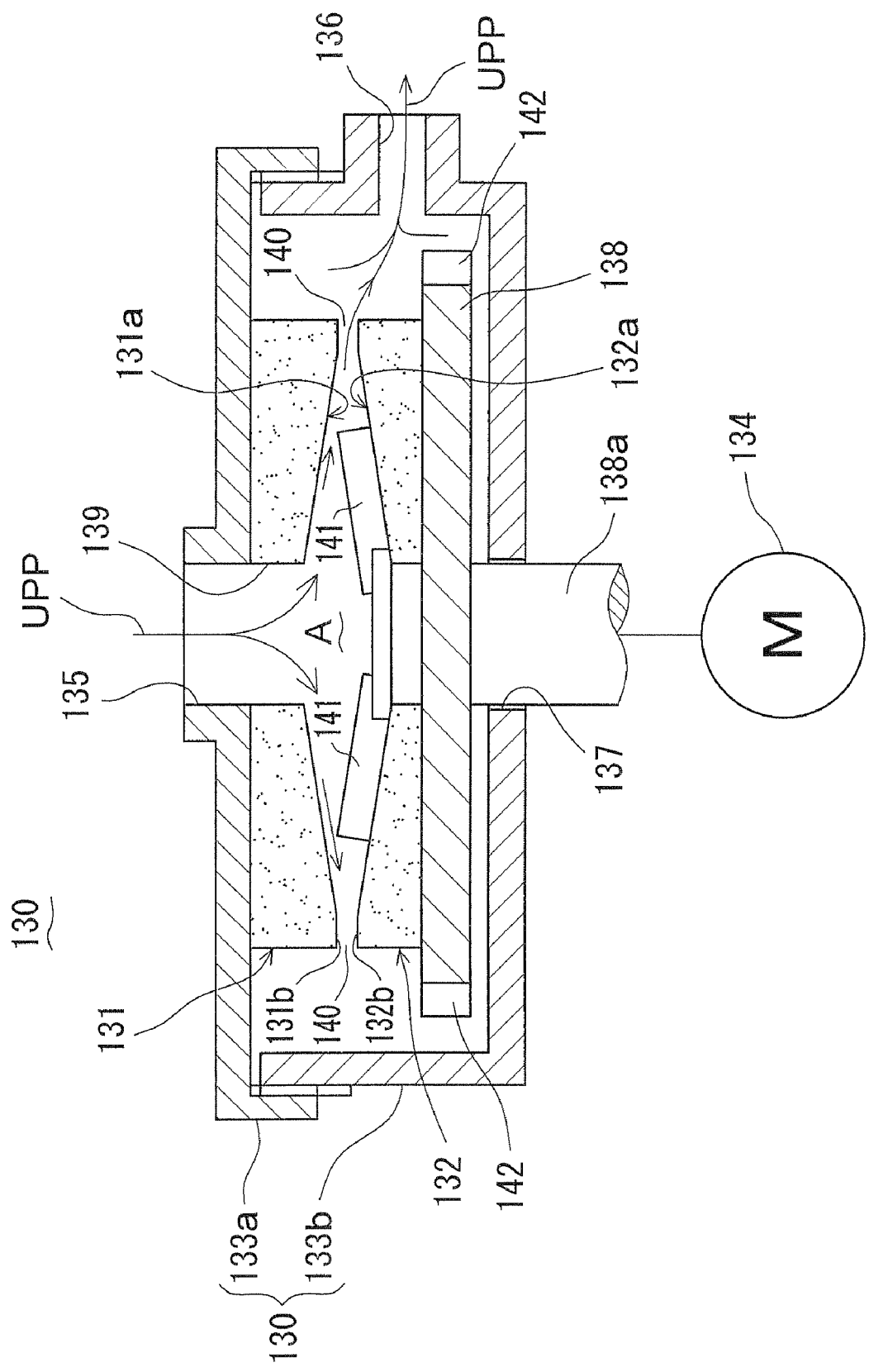
FIG. 8 is a front sectional view of essential parts of mashing unit of pulp making section in the used paper recycling apparatus.

The mashing machine 130 is, as shown in FIG. 8, mainly composed of a plurality of (two in this case) relatively moving mashing members 131, 132 disposed oppositely across a tiny mashing clearance, and specifically includes a mashing tank 133 communicating with the agitating tank 115 of the macerating unit 110, the mashing members 131, 132 provided relatively movably in the mashing tank 133, and a drive source 134 for driving the mashing members 131, 132 relatively.

In the mashing machine 130, although not shown specifically in the drawing, the mashing members 131, 132 are relatively moving disks, and more specifically the upper mashing member 131 is fixed, and the lower mashing member 132 is rotatable.

The mashing tank 133 has an upper and lower divided structure so as to contain the pair of mashing members 131, 132 in a closed cylindrical shape, with the upper tank 133a and lower tank 133b mutually engaged. The mashing tank 133 has a feed port 135 opened in the center of the ceiling of the upper tank 133a, and a discharge port 136 opened in the cylindrical side of the lower tank 133b, and the feed port 135 and discharge port 136 are connected to communicate with the agitating tank 115 of the macerating unit 110 by way of piping not shown. Although not shown specifically, the feed port 135 communicates with the bottom position of the agitating tank 115, and the discharge port 136 communicates with the upper position of the agitating tank 115.

The upper fixed side mashing member 131 is fixed to the ceiling inner side of the upper tank 133a by proper fixing means, and the lower rotatable mashing member 132 is provided oppositely to the fixed side mashing member 131 concentrically across a tiny mashing clearance A.

The rotatable mashing member 132 provided integrally on a rotary bench 138, and a rotary support shaft 138a of the rotary bench 138 is opposite to the outside of the mashing tank 133 by way of the opening 137 in the bottom of the mashing tank 133, and is directly fixed to the rotary shaft 134a of the drive motor 134 as the rotary drive source in a direct motor structure. This drive motor 134 is specifically an electric motor, and the drive motor 134 is electrically connected to the control section 4.

The opposite sides 131a, 132a of both mashing members 131, 132 forming the tiny mashing clearance A cooperate and form mashing action surfaces. These opposite mashing action surfaces 131a, 132a are grindstone surfaces having multiple abrasive grains coupled by a binding material, and these two mashing action surfaces 131a, 132a are formed in a taper shape gradually increased in diameter toward the mutually opposite directions as shown in FIG. 8, and the mashing clearance A of two conical shapes is formed between them.

In the central position of mashing action surface 131a of the fixed side mashing member 131, an inlet 139 is formed to communicate coaxially with the feed port 135 of the mashing tank 133, and an annular clearance 140 formed between outer peripheral edges 131b, 132b of mashing action surfaces 131a, 132a of the two mashing members 131, 132 is formed as an outlet communicating with the discharge port 136 of the mashing tank 133.

In this relation, a plurality of guide ribs 141, 141, are provided in the mashing action surface 132a of the rotary mashing member 132 at equal intervals in the circumferential direction, and a plurality of blades 142, 142, ... are provided on the outer circumference of the rotary bench 138 for supporting the rotary mashing member 132 at equal intervals in the circumferential direction.

By rotation of the rotary mashing member 132, the plurality of guide ribs 141, 141, ... act to guide the used paper pulp UPP flowing into the mashing clearance A from the inlet 139 into the outlet 140, and the plurality of blades 142, 142, ... act as pump for forcing out the used paper pulp UPP flowing in from the outlet 140 toward the discharge port 136 of the mashing tank 133 by centrifugal force.

The gap of the mashing clearance A is set at about 0.05 to 0.8 mm. The gap of the mashing clearance A can be finely adjusted by relatively rotating the upper tank 133a and lower tank 133b of the mashing tank 133, and moving back and forth the engaged portion. As the gap of the mashing clearance A is finely adjusted depending on the purpose, and high pressure and sliding force depending on the strength and driving force of the apparatus mechanical structure can be obtained in the cooperating action of the mashing action surfaces 131a, 132a. Also by adjusting the gap of the mashing clearance A, the mashing speed of the mashing unit 111 (mashing time) can be also adjusted properly.

In the state of the rotary mashing member 132 rotated and driven on the fixed mashing member 131 by the drive motor 134, the used paper pulp UPP supplied into the feed port 135 of the mashing tank 133 from the agitating tank 115 of the macerating unit 110 flows into the mashing clearance A from the inlet 139, passes through the mashing clearance A, receives the pressurizing and mashing action by the mashing action surfaces 131a, 132a rotating relatively, so that the inks forming characters and patterns on the used paper UP are ground and pulverized, and then it returns again to the agitating tank 115 from the outlet 140 by way of the discharge port 136 of the mashing tank 133.

The feed port 135 and discharge port 136 of the mashing tank 133 are opened and closed by opening means. Specific structure of opening means is not shown, but any conventional manual or automatic opening valve may be used. The opening valve closes the feed port 135 and discharge port 136 when the operation of the mashing unit 111 is stopped, thereby preventing entry of used paper UP or used paper pulp UPP into the mashing tank 133 from the agitating tank 115 of the agitating device 113, and opens the feed port 135 and discharge port 136 when the operation of the mashing unit 111 is started, thereby allowing circulation of used paper pulp UPP between the agitating tank 115 and the mashing tank 133.

In this case, when the macerating unit 110 and mashing unit 111 are driven at the same time, the mashing tank 133 constitutes a pulp circulation tank for allowing circulation of used paper pulp UPP together with the agitating tank 115 of the macerating unit 110, and the used paper pulp UPP flowing and circulating through the pulp circulation tanks 115, 133 receives the agitating and maceration action by the macerating unit 110, and the pressurizing and mashing action and ink grinding and pulverizing action by the mashing unit 111 sequentially and repeatedly. As a result, an appropriate paper strength is obtained for recycled paper RP to be made and regenerated in the paper making section 3 in a later process, and a recycled paper RP of high degree of whiteness is obtained (same effect as de-inking process).

The pulp concentration adjusting unit 112 dispenses a specified amount from the whole amount of used paper pulp UPP supplied from the agitating tank 115, and adds water W from the concentration adjusting water feed unit 114 to the specified dispensed amount, until the total volume of the specified dispensed amount of used paper pulp UPP and water W reaches a specified amount, so that the pulp suspension PS of specified concentration is obtained.

The pulp concentration adjusting unit 112 includes a pulp storing tank 136 provided at the downstream side of the agitating tank 115 for temporarily storing the macerated and mashed used paper pulp UPP, a concentration adjusting tank 200 provided at the downstream side of the pulp storing tank 136, and a water feed unit for adjusting the concentration for supplying water to the concentration adjusting tank 200, and this water feed unit for adjusting the concentration is used commonly with the water feed unit 114 as mentioned above.

The inner volume of the pulp storing tank 136 is determined depending on the number of sheets (weight) of used paper UP to be processed in batch in the agitating device 113. In the illustrated preferred embodiment, the pulp storing tank 136 is supposed to have a volume enough to adjust the concentration of used paper pulp UPP corresponding to the capacity of batch processing of about 8 sheets (about 32 g) of used paper UP of A4 format as stated above.

In this relation, although not shown specifically, a drain port is provided in the bottom of the agitating tank 115 of the agitating device 113, and the whole volume of the used paper pulp UPP manufactured in the agitating tank 115 (and the mashing tank 133) is dropped by gravity through the drain port of the agitating tank 115, and supplied into the pulp storing tank 136. The drain port is opened and closed by drain valve such as electromagnetic valve, and is electrically connected to the control section 4.

The concentration adjusting tank 200 includes two small tanks 201, 202, and is formed as a concentration adjusting tank.

That is, the concentration adjusting tank 200 is composed of a pulp dispensing tank 201 for dispensing a specified amount from the whole volume of the used paper pulp UPP supplied from the agitating tank 115, that is, the whole volume of the used paper pulp UPP stored in the pulp storing tank 136, and a water storing tank 202 for receiving water W of the amount corresponding to the dispensed portion of the used paper pulp UPP from the water feed unit for adjusting the concentration 114.

Specifically, in the upper position of the water storing tank 202, the pulp dispensing tank 201 is incorporated to form a double tank structure, and a drain port (not shown) explained below is provided in the bottom of the pulp dispensing tank 201.

The inner volume of the pup dispensing tank 201 is determined depending on the specified dispensing amount dispensed and supplied from the used paper pulp UPP stored in the pulp storing tank 136, and the inner volume of the water storing tank 202 is determined on the basis of the volume of the pulp dispensing tank 201 and the amount of water W corresponding to the used paper pulp UPP dispensed and stored in the pulp dispensing tank 201. In the illustrated preferred embodiment, supposing that the pulp storing tank 136 has a volume large enough to process about 25 sheets (about 100 g) of used paper UP of A4 format, and storing the corresponding amount of used paper pulp UPP, the inner volume of the pulp dispensing tank 201 is set at a capacity of about 150 cc, for example, and the inner volume of the water storing tank 202 is set at a capacity of about 13 liters, for example.

In this relation, drain ports 201a, 202a opening and closed by an electromagnetic valve are provided in the bottom of the pulp dispensing tank 201 and water storing tank 202, and the electromagnetic valves of these drain ports 201a, 202a are electrically connected to the control section 4.

In the concentration adjusting tank 200, a specified amount (150 cc) is dispensed from the whole volume of used paper pulp UPP (about 100 g of used paper UP+5 liters of water W) supplied and stored in the pulp storing tank 136 from the agitating tank 115, and is transferred and supplied into the pulp dispensing tank 201 of the concentration adjusting tank 200. On the other hand, corresponding to the dispensed amount of the used paper pulp UPP, about 13 liters of water W is transferred and supplied in the water storing tank 202 from the water feed unit for adjusting concentration 114 (to be precise, until the total with the dispensed amount (150 cc) of used paper pulp UPP reaches 13 liters).

In succession, the drain port 201a of the pulp dispensing tank 201 is opened by the electromagnetic valve, and the whole volume (150 cc) of used paper pulp UPP in the pulp dispensing tank 201 is dropped by gravity into the water storing tank 202, and is mixed with the water W in the water storing tank 202, so that the pulp suspension PS in the water storing tank 202 is mixed to a specified concentration (about 0.1%, a target concentration).

The target concentration of the mixed pulp suspension PS has been set in consideration of the paper making capacity in the paper making section 3 described below on the basis of data of preliminary experiments.

In this manner, the pulp suspension PS adjusted to about 0.1% (target concentration) in the concentration adjusting tank 200 of the concentration adjusting section 9 is entirely dropped by gravity and supplied and stored in the pulp feed tank 55 of the paper making section 3 in a succeeding process as the drain port 201a of the pulp dispensing tank 201 is opened.

The concentration adjusting interval of the dispensing type by the pulp concentration adjusting unit 112 determined at a proper timing so that the amount of the pulp suspension PS in the pulp feed tank 55 may not be less than a specified amount, and for example when the paper making section 3 is controlled to process 13 liters of pulp suspension PS in about 1 minute, the concentration adjusting interval is set within 1 minute by the pulp concentration adjusting unit 112.

Thus, by the pulp concentration adjusting unit 112, since the concentration is adjusted in dispensed portions, not in batch of whole volume, the consumption of water is substantially saved, and the concentration adjusting tank 200 is substantially reduced in size, and the entire structure of the used paper recycling apparatus 1 is made compact.

The control section 4 controls automatically by mutually interlocking the actions of the drive units of the macerating unit 110 and the paper making section 3, and is specifically composed of microcomputers including CPU, ROM, RAM, and I/O ports.

The control section 4 stores programs for executing the pulp making process of the pulp making section 2 and the paper making process of the paper making section 3 continuously, and also stores various information necessary for driving the drive units, such as the driving time of the agitating device 113 in the macerating unit 110, the operation timing of the water feed unit 114, the running speed of the conveyors 15, 90 in the paper making section 3, the driving time of the heating and drying unit 91, and the operation timing of the fixed size cutter 101, which may be preliminarily stored as data or entered selectively by the keyboard or the like.

As mentioned above, the control section 4 has other drive units and detectors for composing the pulp making section 2 and the paper making section 3 connected electrically, and the control section 4 controls the drive units according to various measured values and data.

The used paper recycling apparatus 1 thus composed is started when the power is supplied, and the drive units are mutually related and controlled automatically by the control section 4, and the used paper UP, UP, . . . supplied in the inlet 5*a* of the apparatus case 5 is macerated and mashed by the pulp making section 2, macerating unit 110, and mashing unit 111, and used paper pulp UPP is manufactured, and this used paper pulp UPP is manufactured in the paper making process unit 10 in the paper making section 3, the dewatering roll unit 11, and the drying process unit 12, and is regenerated as recycled paper RP, and is discharged into the recycled paper receive tray from the outlet 5*b* of the apparatus case 5.

In the used paper recycling apparatus 1 having such configuration, the paper making section (paper machine) 3 includes a paper making process unit 10 for manufacturing wet paper $RP_0$ from a slurry pulp suspension PS containing water W and used paper pulp UP sent from the pulp making section 2 of a preceding process, and a drying process unit 12 for making recycled paper RP by drying the wet paper $RP_0$ manufactured in the paper making process unit 10, and the paper making process unit 10 and the drying process unit 12 are disposed in upper and lower layers, and a processing conveyor 15 is disposed between the paper making process unit 10 and the drying process unit 12 in upper and lower layer structure extending in the overall length of the paper making process and the drying process, and this processing conveyor 15 is manufactured in a form of net belt conveyor having a running mesh belt 20 of mesh structure composed of innumerable mesh cells for filtering and dewatering the pulp suspension PS, and hence the wet paper $RP_0$ manufactured in the paper making process unit 10 is transferred directly to the drying process unit 12, and is dried and processed.

That is, the slurry pulp suspension PS sent from the pulp making section 2 of a preceding process is processed on the same net belt conveyor sequentially from the paper making process to the drying process, and it is not required to exchange the conveyors when changing the process of the manufactured wet paper $RP_0$ from the paper making process to the drying process, and troubles in the transfer process (change of conveyors) can be avoided, such as defective transfer of wet paper $RP_0$, crease, tear or cut of paper, and others, and a recycled paper RP of high quality is obtained.

According to the paper making section 13 of the preferred embodiment, the following outstanding effects are obtained, and the preferred embodiment presents the used paper recycling apparatus 1 that can be installed not only in a large office, but also in a small shop or ordinary household, and is friendly to the environment and low in running cost, and capable of preventing leak of confidential information, private information, and other information, and keeping a high confidentiality.

(1) The invention realizes the used paper recycling apparatus 1 of small size and simple structure including, in an apparatus case 5 of furniture size, a pulp making section 2 for manufacturing used paper pulp UPP by macerating and mashing used paper UP, a paper making section 3 for manufacturing recycled paper RP by making the used paper pulp UPP manufactured in the pulp making section 2, and therefore without discarding the used paper UP, the used paper UP is recycled and reused at the same site of origin, and disposal of used paper UP is reduced, and refuse problems can be solved, and the limited resources can be utilized effectively.

Hitherto, because of confidential problems, recycling of used paper UP has not been promoted, but since the used paper UP can be recycled and reused at the same site of origin, effects of effective utilization of resources are outstanding.

(2) At the site of origin of used paper UP, a compact used paper recycling system having a same function as large scale system installed in paper making plant or used paper recycling plant is installed, and used paper UP can be recycled continuously in a closed circuit in a small shop or general household, and refuse collection and transportation expenses of used paper UP and incineration and other costs are saved, and it is very economical.

(3) Moreover, the apparatus structure is compact, and it can be installed not only in large office, but also in small shop or general household, and from this point of view, too, leak of confidential information and private information can be securely prevented.

(4) Being installed at the site of origin of used paper UP, the used paper UP is macerated and processed by the pulp making section 2 into used paper pulp UPP, and the paper making section 3 manufactures the used paper pulp UPP into recycled paper RP, and thereby the used paper UP is circulated and used as recycled paper RP at the same site of origin, and therefore information of characters and patterns printed on the paper is not diffused outside of the site of origin of used paper, and leak of confidential information and private information can be prevented securely, and the resources can be utilized effectively.

That is, by using the used paper recycling apparatus 1 having the paper making section 3 of the preferred embodiment as the paper machine, it is free from risk of external diffusion of information from a specific institute (for example, school, hospital, city office, law firm, patent office, general household).

In other words, in the case of a conventional shredder, if the used paper is shredded into small chips, and the printed characters and patterns are not legible, the shredded chips are incinerated at an external incineration site, and external diffusion cannot be prevented perfectly. In this regard, the waste chips may be stored within an internal warehouse, but storing place is needed, and the resources are used only once and are not utilized effectively.

By contrast, according to the used paper recycling apparatus 1 of the preferred embodiment, the information printed on the used paper UP is not diffused outside of the closed system, and the resources can be utilized effectively.

As the invention may be embodied in several forms without departing from the spirit of essential characteristics thereof, the present preferred embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A paper machine of used paper recycling apparatus, making up a part of a used paper recycling apparatus of furniture size to be installed at the site of origin of used paper, for manufacturing recycled paper from used paper pulp manufactured in a pulp making device in a preceding process, comprising:
   a paper making process unit for manufacturing wet paper from slurry pulp suspension containing water and used paper pulp sent from the pulp making section, and
   a drying process unit for drying the wet paper manufactured in the paper making process unit and making recycled paper,
   wherein the paper making process unit and the drying process unit are disposed in upper and lower layers, and comprise a processing conveyor extending in the overall length of the paper making process in the paper making process unit and the drying process in the drying process unit, and this processing conveyor is manuffictured in a form of net belt conveyor comprising a running mesh belt having mesh structure composed of innumerable mesh cells for filtering and dewatering the pulp suspension.

2. The paper machine of used paper recycling apparatus of claim 1 wherein the mesh belt of the net belt conveyor runs straightly in the paper making process unit toward the running direction, and runs straightly back and forth in opposite directions in the drying process unit.

3. The paper machine of used paper recycling apparatus of claim 2, wherein in the paper making process unit, the paper making process length of the mesh belt is set in a range of straight running direction length of the mesh belt in the apparatus case of furniture size.

4. The paper machine of used paper recycling apparatus of claim 3, wherein the paper making process length of the mesh belt is sufficient for manufacturing the pulp suspension into a proper paper weight in relation between the filtering and dewatering rate of the mesh structure and the running, speed of the mesh belt, and is set so that the paper making conveyor having the mesh belt may be contained in the apparatus case of furniture size.

5. The paper machine of used paper recycling apparatus of claim 3, wherein the mesh belt is disposed so as to run upward obliquely and straightly toward its running direction.

6. The paper machine of used paper recycling apparatus of claim 5, wherein the upward oblique angle of the mesh belt, is set at 3 degrees to 12 degrees.

7. The paper machine of used paper recycling apparatus of claim 4, wherein the mesh size of the mesh belt is set at 25 mesh cells to 80 mesh cells.

8. The paper machine of used paper recycling apparatus of claim 4, wherein the running speed of the mesh belt is set at 0.1 m/min to 1 m/min.

9. The paper machine of used paper recycling apparatus of claim 1, wherein the paper making process unit is disposed at a start end position of the paper making process of the processing conveyor, and has a pulp feed unit fur supplying the pulp suspension from the pulp manufacturing device to the paper making conveyor, and by this pulp feed unit, the pulp suspension is spread and supplied uniformly on the upside of the mesh belt of the processing conveyor.

10. The paper machine of used paper recycling apparatus of claim 1 or 2, wherein in the drying process unit, a drying conveyor is provided for conveying the wet paper manufactured in the paper making process unit while smoothing and drying, and this drying conveyor is formed as a smooth belt conveyor having a running smooth surface belt of a smooth surface for smoothing the wet paper manufactured in the paper making process unit, and this smooth surface belt runs along the lower side of the running route of the mesh belt of the net conveyor belt, and cooperates with this mesh belt to convey the wet paper while holding from upper and lower sides by the mesh belt and smooth surface belt.

11. The paper machine of used paper recycling apparatus of claim 10, wherein the drying process unit also includes pressing means for pressing the smooth surface belt and the mesh belt by a uniform pressure, and this pressing means has a plurality of pressing rollers disposed at specified pitches in the running direction of the both belts.

12. The paper machine of used paper recycling apparatus of claim 11, wherein in the drying process unit, the lower side of the wet paper is conveyed and supported by the smooth surface belt, and the upper side of the wet paper is conveyed and supported by the mesh belt, and the plurality of pressing rollers press the mesh belt from the upper side.

13. The paper machine of used paper recycling apparatus of claim 10, wherein in the drying process unit, the smooth surface belt for conveying and supporting the lower side of the wet paper is heated by a heater.

14. The paper machine of used paper recycling apparatus of claim 13, wherein the heater has a heater plate sliding, on the opposite side of the conveying and supporting surface of the wet paper on the smooth surface belt, and the wet paper on the smooth surface belt is indirectly heated and dried by the smooth surface belt heated by the heater plate.

15. The paper machine of used paper recycling apparatus of claim 12, wherein in the drying process unit, a cover is provided for controlling the ventilation of the mesh belt for conveying and supporting the upper side of the wet paper.

16. The paper machine of used paper recycling apparatus of claim 10, wherein at the junction of the paper making process unit and the drying process unit, a dewatering roll unit is provided for squeezing and dewatering the wet paper, and this dewatering roll unit rolls and squeezes the mesh belt of the paper making process unit and the smooth surface belt of the drying process unit by pressing from upper and lower sides, and squeezes and dewater the wet paper on the mesh belt.

17. The paper machine of used paper recycling apparatus of claim 16, wherein the paper making process unit, the dewatering roll unit and the drying process unit are driven by a common drive source.

18. A used paper recycling apparams comprising, in an apparatus case of furniture size, a pulp making section for manufacturing used paper pulp by macerating and mashing used paper, a paper making section for manufacturing recycled paper by making the used paper pulp manufactured in the pulp making section, and a control section for driving and controlling, the pulp making section and the paper making section by interlocking, wherein the paper making section comprises a paper making process unit for manufacturing wet paper from a slurry pulp suspension containing water and used paper pulp sent from the pulp making section, and a drying process unit for making, recycled paper by drying the wet paper manufactured in the paper making section, the paper making, process unit and the (hying process unit are disposed in upper and lower layers, and comprise a processing conveyor extending in the overall length of the paper making process in the paper making process unit and the drying process in the drying process unit, and this processing, conveyor is manufactured in a form of net belt conveyor comprising a running mesh belt having mesh structure composed of innumerable mesh cells for filtering and dewatering the pulp suspension.

19. The paper machine of used paper recycling apparatus of claim 2, wherein the paper making process unit is disposed at a start end. position of the paper making process of the processing conveyor, and has a pulp feed unit for supplying the pulp suspension from the pulp manufacturing device to the paper making conveyor, and by this pulp feed unit, the pulp suspension is spread and supplied uniformly on the upside of the mesh belt of the processing conveyor.

* * * * *